(12) United States Patent
Acosta-Serafini et al.

(10) Patent No.: US 8,718,127 B2
(45) Date of Patent: May 6, 2014

(54) APPARATUS AND METHOD FOR DIGITALLY-CONTROLLED ADAPTIVE EQUALIZER

(75) Inventors: Pablo Acosta-Serafini, Medford, MA (US); Kimo Tam, Lincoln, MA (US)

(73) Assignee: Analog Devices, Inc., Norwood, MA (US)

( * ) Notice: Subject to any disclaimer, the term of this patent is extended or adjusted under 35 U.S.C. 154(b) by 261 days.

(21) Appl. No.: 13/196,332

(22) Filed: Aug. 2, 2011

(65) Prior Publication Data
US 2013/0034143 A1   Feb. 7, 2013

(51) Int. Cl.
*H03H 7/30* (2006.01)
*H03H 7/40* (2006.01)
*H03K 5/159* (2006.01)

(52) U.S. Cl.
USPC ........... 375/232; 375/345; 375/350; 327/559; 333/28 R

(58) Field of Classification Search
USPC ......... 375/229–230, 232–233, 285, 345, 350; 455/63.1, 232.1, 234.1, 245.1; 327/559; 333/28 R; 330/304
See application file for complete search history.

(56) References Cited

U.S. PATENT DOCUMENTS

| | | | |
|---|---|---|---|
| 4,441,083 A * | 4/1984 | Akagiri et al. | 330/149 |
| 5,559,464 A | 9/1996 | Orii et al. | |
| 5,680,075 A | 10/1997 | Sacca | |
| 5,818,278 A | 10/1998 | Yamamoto et al. | |
| 5,844,431 A * | 12/1998 | Chen | 327/94 |
| 6,275,112 B1 | 8/2001 | Muza | |
| 6,282,146 B1 | 8/2001 | Guo et al. | |
| 6,289,044 B1 * | 9/2001 | Velez et al. | 375/222 |
| 6,512,472 B1 * | 1/2003 | Smith et al. | 341/155 |
| 6,608,905 B1 | 8/2003 | Muza et al. | |
| 6,653,898 B2 | 11/2003 | Monroe | |
| 6,728,366 B1 * | 4/2004 | Barkaro et al. | 379/347 |
| 6,946,876 B2 | 9/2005 | Isezaki et al. | |
| 7,013,117 B2 | 3/2006 | Darabi | |
| 7,068,091 B1 | 6/2006 | Kwong | |
| 7,250,987 B2 | 7/2007 | Goyal et al. | |
| 7,570,933 B2 * | 8/2009 | Taipale et al. | 455/232.1 |
| 7,710,152 B1 | 5/2010 | El Bacha et al. | |
| 7,970,364 B2 | 6/2011 | Mayer et al. | |

(Continued)

OTHER PUBLICATIONS

Maxim Integrated Products Application Note HFAN-09.0.1, *NRZ Bandwidth—HF Cutoff vs. SNR* (2008), 5 pages (available at World Wide Web page: maxim-ic.com/app-notes/index.mvp/id/870).

(Continued)

*Primary Examiner* — Jean B Corrielus
(74) *Attorney, Agent, or Firm* — Knobbe, Martens, Olson & Bear, LLP

(57) ABSTRACT

Apparatus and methods are disclosed, such as those involving a receiver device. One such apparatus includes an equalizer configured to process an input signal transmitted over a channel. The equalizer includes a first node configured to receive the input signal; a second node; and a programmable gain amplifier (PGA) having an adjustable gain. The PGA has an input electrically coupled to the first node, and an output electrically coupled to a third node. The equalizer also includes a high pass filter (HPF) having an input electrically coupled to the third node, and an output electrically coupled to the second node; and a control block configured to adjust one or more of the PGA or the HPF at least partly in response to a PGA output signal from the PGA or an HPF output signal from the HPF.

29 Claims, 24 Drawing Sheets

(56) References Cited

U.S. PATENT DOCUMENTS

| | | | |
|---|---|---|---|
| 2003/0125000 A1* | 7/2003 | Gharpurey et al. | 455/234.1 |
| 2003/0181179 A1* | 9/2003 | Darabi | 455/234.1 |
| 2004/0090259 A1 | 5/2004 | Randazzo et al. | |
| 2004/0150454 A1 | 8/2004 | Bhattacharya et al. | |
| 2006/0125521 A1 | 6/2006 | Kim | |
| 2006/0128334 A1* | 6/2006 | Ikuta et al. | 455/232.1 |
| 2006/0192614 A1* | 8/2006 | Behzad et al. | 327/559 |
| 2008/0094111 A1 | 4/2008 | Nakamori et al. | |
| 2008/0204109 A1 | 8/2008 | Pilling et al. | |
| 2010/0277215 A1 | 11/2010 | Tam et al. | |
| 2011/0026507 A1* | 2/2011 | Katsube et al. | 370/338 |
| 2011/0076977 A1* | 3/2011 | Coban et al. | 455/234.2 |
| 2011/0153046 A1* | 6/2011 | Nagasue et al. | 700/94 |
| 2011/0317077 A1* | 12/2011 | Coban et al. | 348/726 |
| 2012/0058736 A1* | 3/2012 | Westra et al. | 455/78 |
| 2012/0237010 A1* | 9/2012 | Hurwitz | 379/90.01 |

OTHER PUBLICATIONS

B. Razavi, *Design of Integrated Circuits for Optical Communications* (2003,) McGraw-Hill, 1st edition, pp. 125-126.

E. Crain, *Fast Offset Compensation for a 10Gbps Limit Amplifier* (2004), Thesis for Masters of Engineering in Electrical Engineering and Computer Science at the Massachusetts Institute of Technology, 118 pages.

*High Definition Multimedia Interface Specificaiton Version 1.4* (2009), HDMI Licensing, Inc., Chapter 5, 30 pages.

A. X. Widmer and P. A. Franaszek, *A DC-Balanced, Partitioned-Block, 8B/10B Transmission Code* (1983), IBM Journal of Research and Development, vol. 27, No. 5, pp. 440-451.

D. A. Johns and D. Essig, *Integrated Circuits for Data Transmission Over Twisted-Pair Channels* (1997), IEEE Journal of Solid-State Circuits, vol. 32, No. 3, pp. 398-406.

H. Johnson and M. Graham, *High-speed Digital Design* (1993), Prentice-Hall Inc., p. 428.

*Exotic Materials and Cable Construction*, Blue Jean Cables Article, in 3 pages (downloaded from World Wide Web page: bluejeanscable.com/articles/exoticmaterials.htm on Nov. 1, 2011).

J. Diepenbrock, *Characterization and Modeling of Cables for High-Speed Data Communications Application* (1999), 1999 Electronic Components and Technology Conference, pp. 530-534.

G. Gonzalez, *Microwave Transistor Amplifiers* (1997), second-edition, Prentice-Hall Inc., p. 20.

Notice of Allowance in U.S. Appl. No. 13/196,430, dated Jun. 13, 2013, in 9 pages.

* cited by examiner

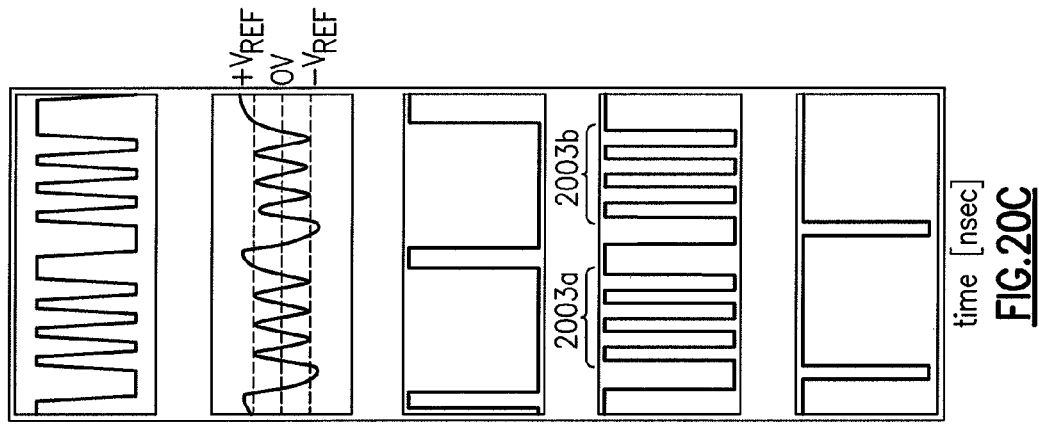
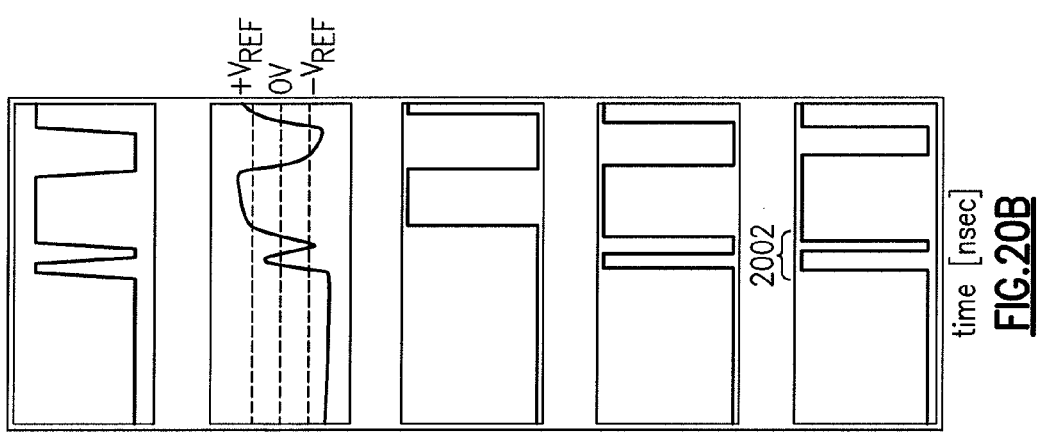
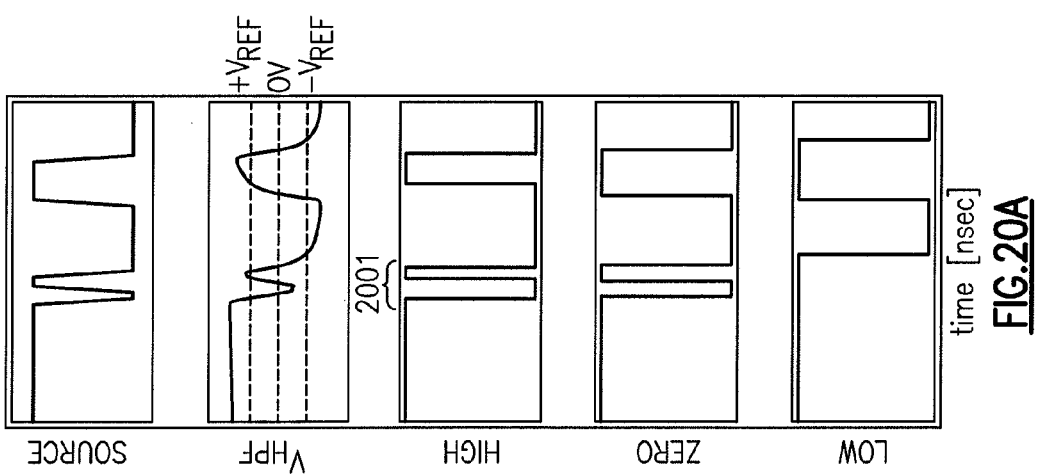

APPARATUS AND METHOD FOR DIGITALLY-CONTROLLED ADAPTIVE EQUALIZER

CROSS-REFERENCE TO RELATED APPLICATIONS

This application is related to copending application Ser. No. 13/196,430, filed Aug. 2, 2011, and titled APPARATUS AND METHOD FOR DIGITALLY-CONTROLLED AUTOMATIC GAIN AMPLIFICATION, the disclosure of which is hereby incorporated by reference in its entirety herein.

This application is related to application titled WIDE-BAND VOLTAGE TRANSLATORS, Ser. No. 12/503,372, filed on Jul. 15, 2009, now U.S. Pat. No. 8,106,700, issued Jan. 31, 2012, the disclosure of which is hereby incorporated by reference in its entirety herein.

BACKGROUND

1. Field

Embodiments of the invention relate to electronic devices, and more particularly, in one or more embodiments, to data transmission for electronic devices.

2. Description of the Related Technology

Many electronic systems transmit data over a channel between devices. Referring to FIG. 1A, a conventional electronic communication system for transmitting a signal via a channel will be described below. The illustrated system 100 includes a transmitter device 110, a receiver device 120, and a channel 130.

The transmitter device 110 transmits data and/or control signals to the receiver device 120 via the channel 130. Examples of the transmitter device 110 include, but are not limited to, a video data source, an audio data source, or an audiovisual data source. For example, the audiovisual data source can be a DVD player.

The receiver device 120 receives data and/or control signals from the transmitter device 110 via the channel 130. Examples of the receiver device 120 include, but are not limited to, a display device, such as a television or monitor. The receiver device 120 can include a receiver 125 to receive and process data and/or control signals from the transmitter device 110.

The channel 130 can include one or more media, such as, but not limited to, copper twisted pair channels, printed circuit board traces, or optical fiber. In another example, at least part of the channel 130 can be wireless. In other examples, the system 100 can also include a "back-channel" between the transmitter device 110 and the receiver device 120. The back-channel can be used for exchanging, for example, control information. For example, the back-channel can be used to set pre-emphasis (transmit equalization) in the transmitter device 110. The transmitter device 110 can send a test pattern to the receiver device 120 so that the receiver device 120 can adapt the equalization gain of the receiver 125. If the equalization is at its maximum and there still exist bit errors above an acceptable rate, the receiver device 120 can inform the transmitter device 110 of this fact so that the transmitter device 110 can start pre-emphasizing its output in steps, and at each step the receiver device 120 can inform the transmitter device 110 of a bit error rate.

Referring to FIG. 1B, one example of the receiver 125 of FIG. 1A will be described below. The receiver 125 can be, for example, a High-Definition Multimedia Interface (HDMI) receiver. The illustrated receiver 125 is a 4-input receiver that includes first to fourth equalizers 130a-130d, first to fourth samplers 140a-140d, a multiplexer 150, and a processor 160. In other examples, the number of inputs of a receiver can vary widely (for example, 1 to 5 inputs).

Each of the equalizers 130a-130d receives three signals via the channel 130 (FIG. 1A) at inputs RXA_0 to RXA_2, RXB_0 to RXB_2, RXC_0 to RXC_2, RXD_0 to RXD_2, and processes the signals. Each of the samplers 140a-140c receives processed data signals from a respective one of the equalizers 130a-130d, and samples the signals. The multiplexer 150 receives the sampled signals from the samplers 140a-140d, and selectively or alternately provides the sampled signals to the processor 160. The processor 160 can process the sampled signals for, for example, playback at the receiver device 120 (FIG. 1A).

In one example, the electronic system 100 of FIG. 1A can form a serial digital link system in which the transmitter device 110 sends one or more streams of bits or digits encoded in suitable symbols to the receiver device 120 through the channel 130. In such an example, it is desirable that the serial link can transmit symbols at a given rate with low error probability.

SUMMARY

In one embodiment, an apparatus includes: an equalizer configured to process an input signal transmitted over a channel. The equalizer includes: a first node configured to receive the input signal; a second node; a programmable gain amplifier (PGA) having an adjustable gain, the PGA having an input electrically coupled to the first node, and an output electrically coupled to a third node; a high pass filter (HPF) having an input electrically coupled to the third node, and an output electrically coupled to the second node; and a control block configured to adjust one or more of the PGA or the HPF at least partly in response to a PGA output signal from the PGA or an HPF output signal from the HPF.

In another embodiment, an apparatus includes: a high pass filter (HPF) having an input to receive an input signal and an output to provide an HPF output signal, the HPF being configured to boost the input signal within a selected frequency range. The HPF includes one or more unit stages coupled in series between the input and the output of the HPF, and each of the unit stages has a boost frequency range within which a signal is boosted by the unit stage.

In yet another embodiment, a method for adapting a gain of a programmable gain amplifier in a receiver is provided. The method includes: receiving an input signal at an input of a receiver over a channel; amplifying the input signal with a programmable gain amplifier (PGA) with an adjustable gain to generate a PGA output signal having an amplitude envelope; monitoring the amplitude envelope of the PGA output signal; and adjusting the gain of the PGA, based at least partly on the monitored amplitude envelope.

In yet another embodiment, a method for adapting a frequency boost setting of a high-pass filter in a receiver is provided. The method includes: receiving an input signal at an input of a receiver over a channel; boosting a frequency range of the input signal with a high-pass filter (HPF) with an adjustable frequency boost setting to generate an HPF output signal; monitoring a plurality of transitions of the HPF output signal with reference to two or more reference voltages to determine whether the HPF output signal is under-equalized; and adjusting the boost setting of the HPF, based at least partly on the monitored transitions.

BRIEF DESCRIPTION OF THE DRAWINGS

FIG. 20A show timing diagrams of outputs of the window comparator of FIG. 19 for the first example under-equalized serial data stream of FIGS. 15A and 15B.

FIG. 20B show timing diagrams of outputs of the window comparator of FIG. 19 for the second example under-equalized serial data stream of FIGS. 16A and 16B.

FIG. 20C show timing diagrams of outputs of the window comparator of FIG. 19 for the third example under-equalized serial data stream of FIGS. 17A and 17B.

DETAILED DESCRIPTION OF EMBODIMENTS

Figure 1A:
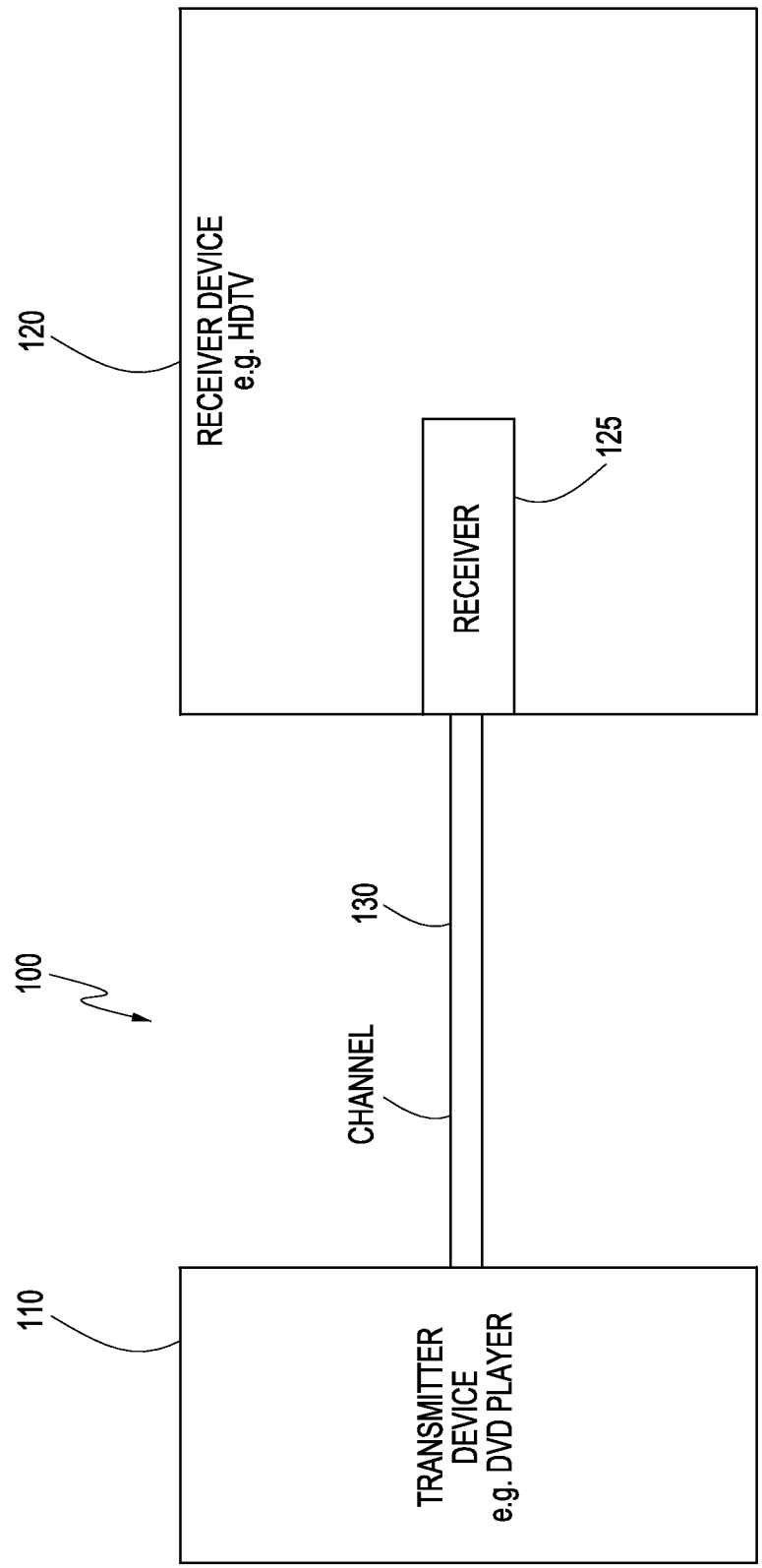
FIG. 1A is a schematic block diagram illustrating a conventional electronic system including a transmitter device and a receiver device.

The following detailed description of certain embodiments presents various descriptions of specific embodiments of the invention. However, the invention can be embodied in a multitude of different ways as defined and covered by the claims. In this description, reference is made to the drawings in which like reference numerals indicate identical or functionally similar elements.

Overview of Serial Data Transmission

Figure 2:
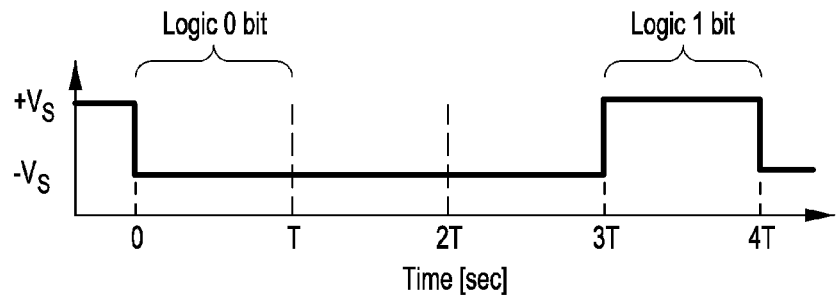
FIG. 2 is a timing diagram of an example of bit encoding for a serial digital data link.

FIG. 2 shows one example of a sequence that can be transmitted in the system 100 of FIG. 1A. In one example, the transmitter device 110 (FIG. 1A) can encode a single bit at a time, and send a positive voltage +Vs when the bit is a logic one (or high), or a negative voltage −Vs when the bit is a logic zero (or low). In this case, the symbol rate of the sequence is identical to the bit rate, and the minimum inter-symbol distance is 2·Vs. The term "bit rate" refers to the number of data bits transmitted per second in original form before symbol-encoding. The term "symbol rate" refers to the number of symbols transmitted per second. For example, in High-Definition Multimedia Interface (HDMI), Serial Advanced Technology Attachment (SATA), or the like, the bit rate and the symbol rate are the same as each other. In other words, the encoding is 1 bit per symbol. However, in other instances, the bit rate can be different from the symbol rate. For example, assume that a first system has two voltage levels, +Vs and −Vs and its symbol rate is 1 Gigabits (Gb)/sec, and that a second system has a symbol rate of 1 Gb/sec, but has 4 voltage levels (for example, +2Vs, +1Vs, −1Vs, −2Vs). The second system has a symbol rate the same as the first system, but the bit rate of the second system is twice the bit rate of the first system. The term "inter-symbol distance" refers to a difference between voltage levels representing different symbols.

The symbol rate can also be referred to as a data rate (DR), and can be constant. It can be desirable that each bit lasts the same duration or period of time, T=1/DR. Such symbol encoding is used in various serial link standard specifications, such as HDMI, SATA, or Peripheral Component Interconnect (PCI) Express.

Figure 3:
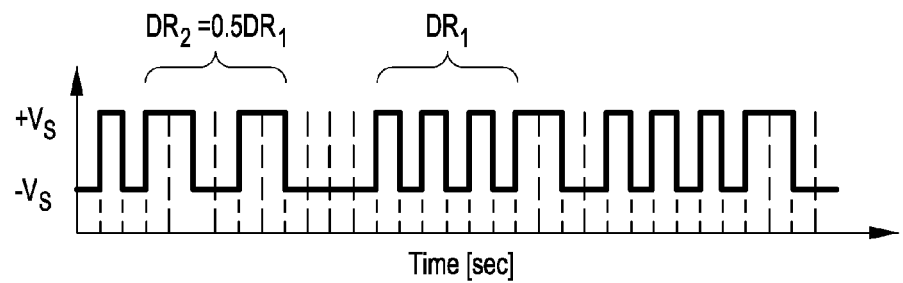
FIG. 3 is a timing diagram of the bit encoding of FIG. 2 on different transmitted data words, and illustrates how the effective data rate can change based on the transmitted data words.

With serial transmission of symbols, the effective data rate can also change temporally, depending on which symbols are being transmitted. This can make the spectral content of a symbol stream broad and time-dependent. FIG. 3 shows an example of a symbol sequence that can be encountered in a system using the HDMI standard.

Symbol rate and/or error probability can be adversely affected by parts of a communication system, for example, the transmitter device 110, the receiver device 120, and the channel 130 of the system 100. Transmitter devices can suffer from two main non-idealities: symbol period variability (which can also be referred to as jitter) and minimum inter-symbol distance variability.

Figures 4A, 4B:
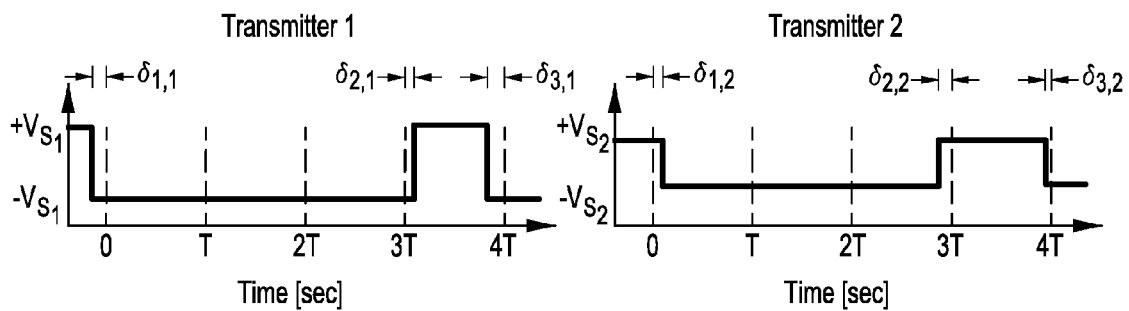
FIGS. 4A and 4B are timing diagrams illustrating examples of jitter and minimum inter-symbol distance variability.

Symbol period variability can occur because each symbol period can be slightly longer or shorter than the reference (constant) symbol period. The sources of these differences can be deterministic (inter-symbol interference, duty cycle distortion, or the like) or random (noise or the like). FIGS. 4A and 4B illustrate two different examples of jitter and minimum inter-symbol variability. FIG. 4A shows symbol period variability $\delta_{1,1}$, $\delta_{2,1}$, $\delta_{3,1}$, and FIG. 4B shows symbol period variability $\delta_{1,2}$, $\delta_{2,2}$, $\delta_{3,2}$, relative to the duration T of the sequence of FIG. 2. Symbol period variability can degrade symbol detection as a relatively good symbol sampling point can be difficult to determine and/or fluctuate temporally.

The source of variability can be deterministic (by design, systematic offsets, or the like) or random (resistivity variation, fabrication lot-to-lot variation, or the like). In the illustrated example, the inter-symbol variability of the Transmitter 1 of FIG. 4A is greater than the inter-symbol variability of the Transmitter 2 of FIG. 4B.

Figure 5:
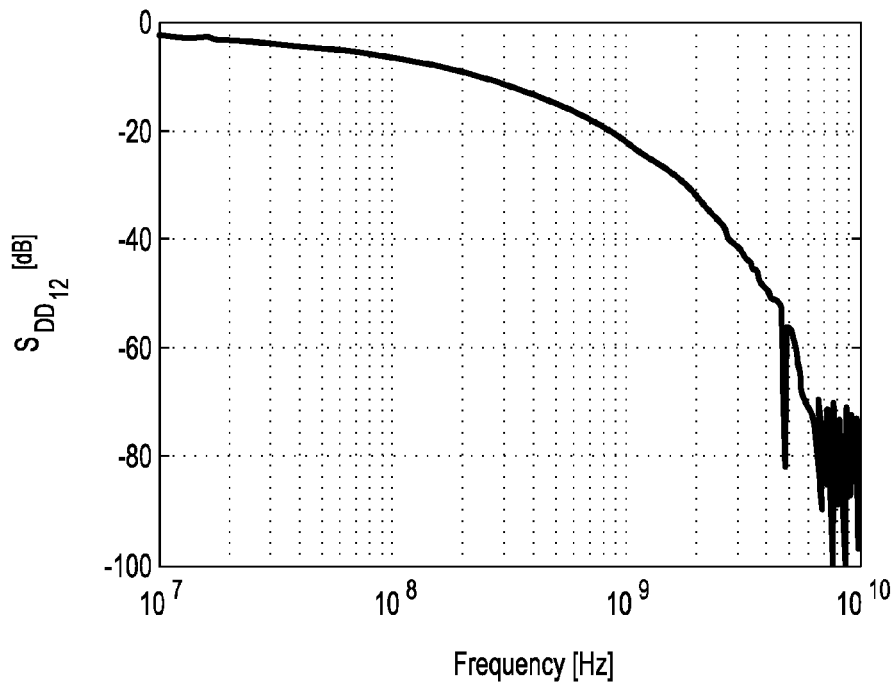
FIG. 5 is a graph illustrating the input/output transfer function of an example HDMI channel.

A transmission channel, such as the channel 130 of FIG. 1A, can affect a bit stream in a variety of ways which can make received symbols an altered representation of transmitted symbols. A channel can have frequency-dependent attenuation, introduce noise, introduce crosstalk between adjacent channels, or the like, any of which can distort the transmitted symbols and make the decoding of the received symbols more difficult. Several channel types are low-pass by nature in that their minimum inter-symbol difference attenuation at high frequencies is higher (sometimes substantially higher) than their attenuation at low frequencies. FIG. 5 illustrates an example of the input/output transfer function of a 30-meter 24 American Wire Gage (AWG) HDMI cable, which has low-pass characteristics.

Figure 6A:
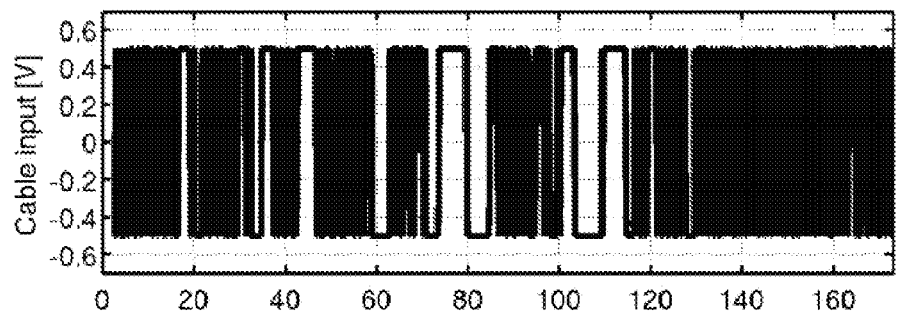
FIG. 6A is a timing diagram of a serial bit stream at a channel input of the example HDMI channel.
Figure 6B:
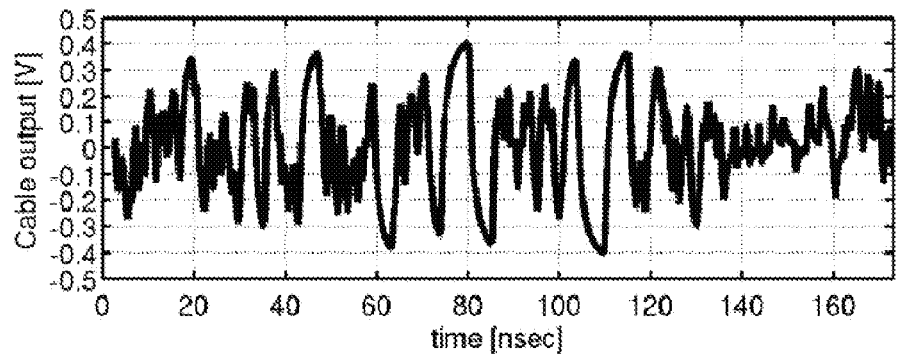
FIG. 6B is a timing diagram of the serial bit stream of FIG. 6A at a channel output of the example HDMI channel.

The channel's low-pass characteristic in conjunction with the broad frequency spectrum of the transmit symbol stream can result in relatively large variations in the received symbol stream signal. This can result into a signal that has a time-varying instantaneous power spectrum. FIG. 6 shows a section of a received HDMI bit stream at the output of a 30-meter 24AWG HDMI cable where the amplitude difference between high data rate sections to low data rate sections can be higher than 4:1.

Receivers for Compensation for Non-Idealities

Figure 1B:
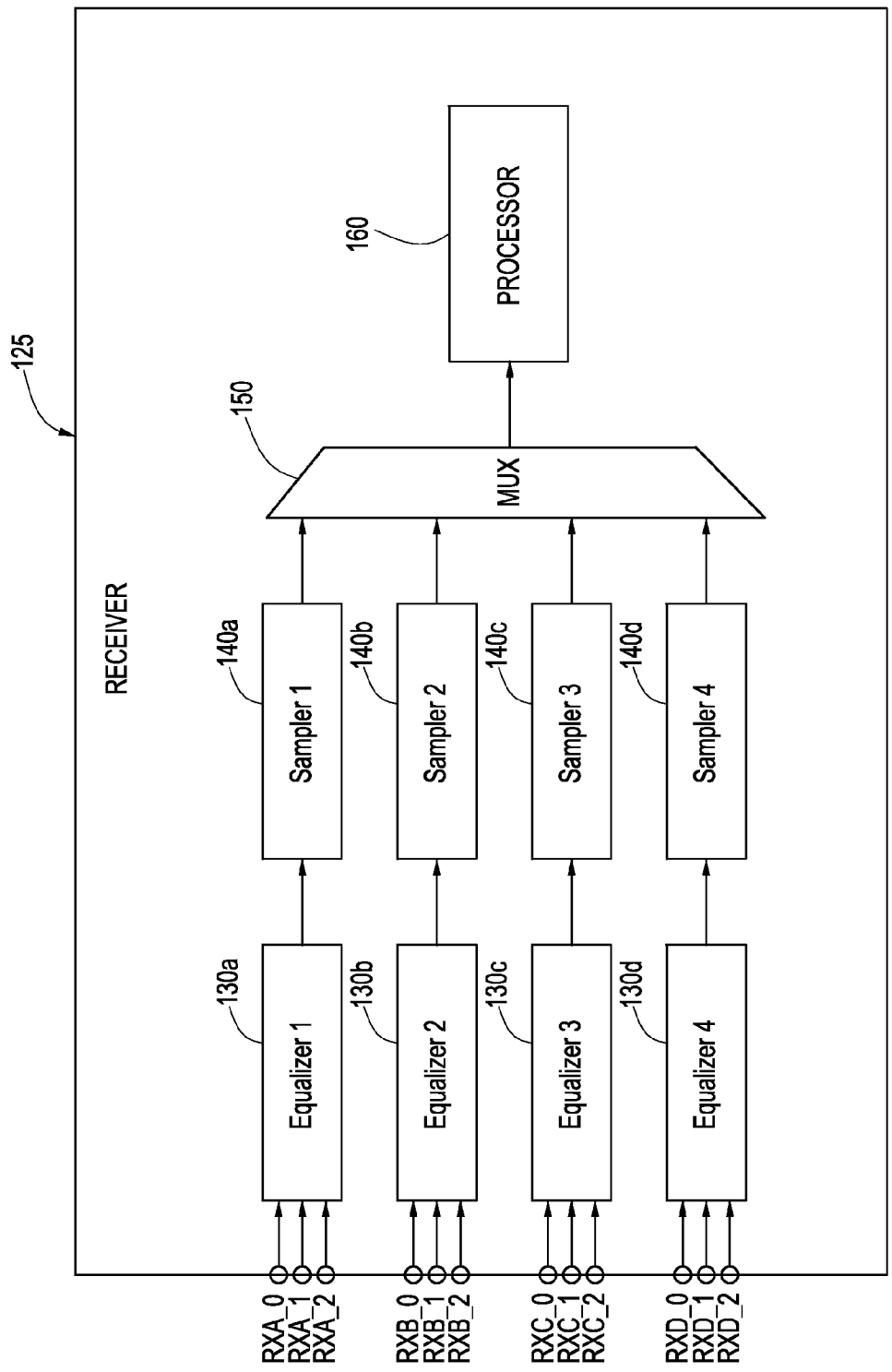
FIG. 1B is a schematic block diagram illustrating a schematic block diagram illustrating a conventional receiver.
Figure 7:
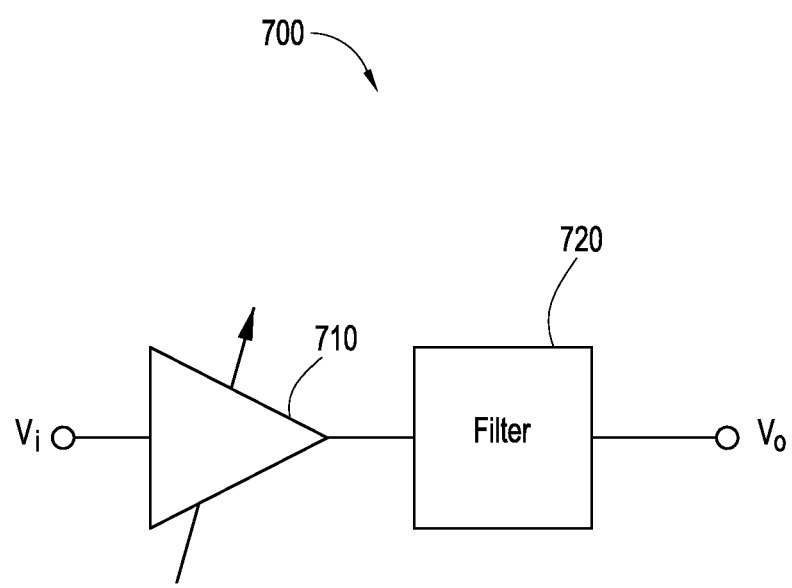
FIG. 7 is a schematic block diagram of a conventional equalizer in a receiver.

A receiver device in a data communication system can be configured to compensate for selected non-idealities. Referring to FIG. 7, in a serial link system, such as that shown in FIG. 1A, an equalizer 700 can include a programmable-gain amplifier (PGA) 710 for compensation for non-idealities in a transmitter device of the system, and/or a filter 720 for compensation for non-idealities in a channel of the system. Referring back to FIG. 1B, each of the equalizers 130a-130d can include a PGA and/or a filter for each of serial data links coupled to the inputs RXA_0 to RXA_2, RXB_0 to RXB_2, RXC_0 to RXC_2, RXD_0 to RXD_2.

In certain instances, a filter that approximates the inverse of the input/output transfer function of the channel can be used in the receiver to cancel the effects of the channel which has low-pass characteristics. Such a filter typically uses a constant minimum inter-symbol distance, which can be achieved by placing a PGA between the channel and the filter. The gain of the PGA needs to be adjusted, depending on the target filter input signal requirements as well as deviations of the transmitter minimum inter-symbol distance from nominal values and the channel being used. In many systems, neither the transmitter minimum inter-symbol distance nor the characteristics of the channel being used are known, and thus, selection of the proper amount of gain can be difficult to determine.

In certain instances, a filter that approximates the inverse of the input/output transfer function of the channel can be used in the receiver to cancel the effects of the channel, which has low-pass characteristics. In other instances, an improperly equalized bit stream can exhibit residual inter-symbol interference (ISI) jitter because the effective bandwidth of the combined system, channel and equalizer is not high enough (under-equalization) or because there is too much high frequency boost provided by the equalizer, which leads to peaking in the frequency response or overshooting in the time domain (over-equalization).

Therefore, selection of the right amount and frequency of the high frequency boost to compensate for the low pass filtering nature of many channels is a difficult task because it is highly dependent on data rate and the actual channel characteristics (cable length, cable wire gauge, and the like), both of which typically cannot be easily ascertained. Moreover, in some systems, both of these parameters can change relatively frequently.

Such a filter in a receiver typically uses a constant minimum inter-symbol distance, which is usually achieved by placing a PGA between the channel and the filter. The gain of the PGA should be adjusted, depending on the target filter input signal requirements as well as deviations of the transmitter minimum inter-symbol distance from nominal values and the channel being used. Selection of the proper gain is a difficult problem because, in many systems, neither the transmitter minimum inter-symbol distance nor the characteristics of the channel being used are known.

In one embodiment, a digitally-controlled equalizer can include a digitally-controlled PGA. The PGA can be suitable for a serial digital link system in which a fixed output amplitude needs to be presented to a channel-equalizing filter when the input received has a wide amplitude range. In addition, a method is provided for selecting the PGA gain automatically (hence creating an automatic gain-controlled amplifier or AGC) and without a priori knowledge of the channel or of the transmitter characteristics, such that a relatively good PGA gain can be selected by observing the PGA output signal with a time-dependent instantaneous power.

In another embodiment, a digitally-controlled equalizer (DCEQ) is provided. The DCEQ can include the digitally-controlled PGA described above, a digitally-controlled high-pass filter (HPF), and a control circuit. The control circuit can include high-speed hardware and synthesized logic. The logic can implement an adaptation method that selects the PGA gain and HPF high-frequency boost automatically and without a priori knowledge of the channel or of the transmitter characteristics. The embodiments described herein can also reduce power dissipation and silicon area while providing reliable data transmission with the increased cable length.

Digitally-Controlled Equalizer

Figure 8:
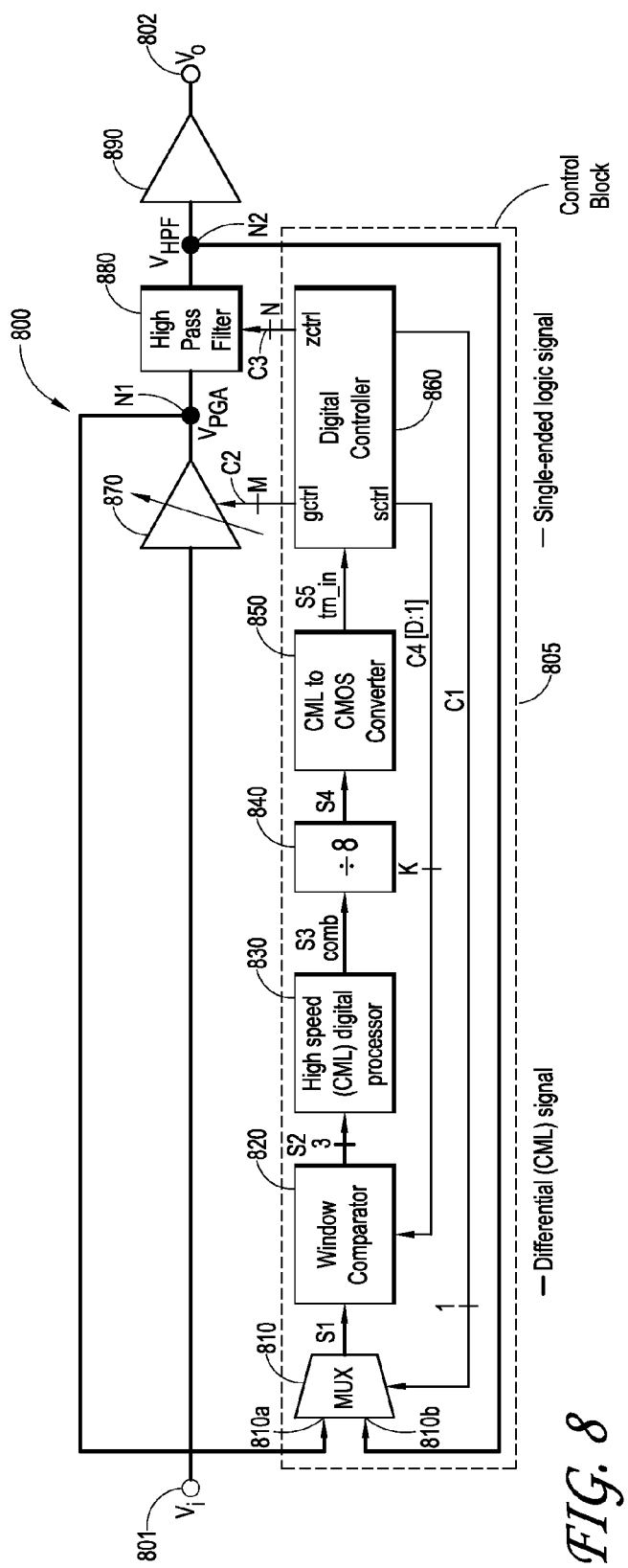
FIG. 8 is a schematic block diagram illustrating an equalizer block of a receiver according to one embodiment.

Referring to FIG. 8, a digitally-controlled equalizer according to one embodiment will be described below. The illustrated equalizer 800 includes a multiplexer 810, a window comparator 820, a high-speed digital processor 830, a frequency divider 840, a logic representation converter 850, a digital controller 860, a programmable gain amplifier (PGA) 870, a high pass filter (HPF) 880, an output amplifier 890, an input node 801, an output node 802, and first and second nodes N1, N2. The components 810-860 form a control block 805.

The multiplexer 810 can receive a PGA output signal $V_{PGA}$ from the first node N1 and a HPF output signal $V_{HPF}$ from the second node N2 at its first and second inputs, 810*a*, 810*b*, respectively. The multiplexer 810 can select one of the PGA output signal $V_{PGA}$ or the HPF output signal $V_{HPF}$ in response to a first control signal C1 from the digital controller 860, and provide the selected signal to the window comparator 820 as a comparator input signal S1.

The window comparator 820 serves to receive the comparator input signal S1 from the multiplexer 810. The window comparator 820 serves to compare the comparator input signal S1 with two or more reference voltages, and generate a comparison signal S2 indicative of the result of the comparison. In the illustrated embodiment, the comparison signal S2 can include three different signals, which correspond to a positive window voltage reference $+V_{REF}$, ground, and a negative voltage reference $-V_{REF}$. In one embodiment, the positive voltage reference $+V_{REF}$ is generated by a digital-to-analog converter based on a value sctr1 generated by the digital controller 860 and carried by a fourth control signal C4. Details of the window comparator 820 will be described later in connection with FIG. 9.

The high-speed digital processor 830 serves to receive the comparison signal S2, and perform logical operations on the comparison signal S2. The high-speed digital processor 830 can be a current mode logic (CML) processor that performs several logic operations on the comparison signal S2, and generates a single differential logic signal as an output, which is referred to as a first differential signal (comb) S3 in the context of this embodiment.

The frequency divider 840 serves to receive the first differential signal S3, and divide the frequency of the signal S3 by, for example, 8. In other embodiments, the frequency divider 840 can be a divide-by-N block, in which N is an integer equal to or greater than 2. The frequency divider 840 thus generates a lower speed differential signal, which is referred to as a second differential signal S4 in the context of this embodiment.

The logic representation converter 850 can be a current mode logic to complementary metal oxide semiconductor (CML-to-CMOS) converter that serves to receive the second differential signal S4, and convert it into a signal labeled trn-in 55, which has CMOS logic levels. The digital controller 860 receives the signal trn-in 55 from the logic representation converter 850, and provides first, second, third, and fourth control signals C1-C4 to the multiplexer 810, the programmable gain amplifier 870, the high pass filter 880, and the window comparator 820, respectively. The fourth control signal C4 can be supplied via a bus sctr1 [D:1].

The programmable gain amplifier (PGA) 870 serves to receive an input voltage signal Vi and amplify the input voltage signal Vi to generate the PGA output signal $V_{PGA}$. The gain of the programmable gain amplifier 870 can be digitally controlled using the second control signal C2 from the digital controller 860. Altering the gain of the PGA 870 adjusts the overall gain of the frequency response of the equalizer 800 such that it can be programmatically increased or decreased in response to the transmitter and channel characteristics. Details of the programmable gain amplifier 870 will be described later in connection with FIGS. 10A, 10B, and 11.

The high pass filter (HPF) 880 serves to receive the PGA output signal $V_{PGA}$ from the programmable gain amplifier 870, and selectively amplify certain frequencies of the PGA output signal $V_{PGA}$ to generate the HPF output signal $V_{HPF}$. The operation of the high pass filter 880 can be digitally controlled using the third control signal C3 from the digital controller 860. Details of the high pass filter 880 will be described later in connection with, for example, FIGS. 13A, 13B, 13C, and 14.

The output amplifier 890 amplifies the HPF output signal $V_{HPF}$ with a selected gain, and generates an output voltage signal Vo.

During operation, the digitally-controlled equalizer 800 adapts the programmable gain amplifier (PGA) 870 and the high pass filter (HPF) 880, based at least partly on detection results from the window comparator 820. The adaptation of the PGA 870 generates a signal of constant amplitude envelope to the HPF 880. The adaptation of the HPF 880 provides sufficient high-frequency boost to compensate for the channel cable loss and thus reduce inter-symbol interference (ISI) jitter.

Another term for a PGA is a variable gain amplifier (VGA). In addition, while illustrated in the context of digital control signals from the PGA control 870, in an alternative embodiment, the digital signals from the PGA control 870 can be provided as an input to a digital-to-analog converter, and an analog signal can be used for gain control of the PGA/VGA.

In one embodiment, the PGA 870 can be initially adjusted or adapted by selecting the PGA output signal $V_{PGA}$ using the multiplexer 810, as will be described later in detail in connection with FIG. 12. Subsequently, the high-pass filter 880 can be adjusted or adapted by selecting the HPF output signal $V_{HPF}$ using the multiplexer 810, as will be described in detail later in connection with FIG. 24. These adjustment or adaptation processes can be repeated, depending on the needs.

A process for adapting the characteristics of the PGA 870 and the HPF 880 can be implemented in the digital controller 860, which can be designed using a hardware description language such as Verilog. The actual transistor-level implementation can be generated automatically from the high-level description by CAD tools that use "standard cells" (for example, inverters, NAND gates, latches, and the like). These standard cells can operate at a particular maximum frequency that is typically much lower than the maximum transition frequency of the input bit stream of the input voltage signal Vi, and potentially of the window comparator outputs. To address this disparity, the frequency divider 840 can lower the maximum frequency of the window comparator output (by a factor of, for example 8) so that it can be reliably used by the digital controller 860. However, if the maximum clock rate of the standard cells is equal to or higher than half the maximum serial link data rate, the frequency divider 840 can be omitted from the equalizer 800.

The high-speed digital processor 830, the frequency divider 840, and the logic representation converter 850 process the window comparator outputs to produce an input signal of suitable maximum frequency that can be handled by the digital controller 860. In the illustrated embodiment, the high-speed current mode logic (CML) digital processor 830 takes the three window comparator outputs S2, performs several logical operations on them, and generates a single differential logic signal S3. Still, the maximum transition frequency of the signal S3 is the maximum transition frequency of the bit stream of the input voltage signal Vi. The frequency divider 840 takes the output signal S4 of the digital processor 830, and slows it to a lower-speed differential signal S4, which is converted to a signal with CMOS logic levels by the logic representation converter 850.

Window Comparator and High Speed Processor

Figure 9:
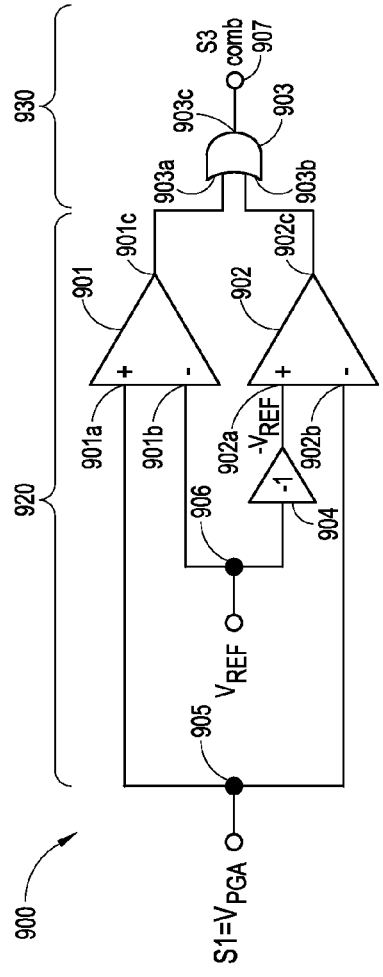
FIG. 9 is a schematic block diagram of a window comparator for programmable gain amplifier according to one embodiment.

Referring to FIG. 9, a window comparator and a high-speed processor according to one embodiment will be described below. The illustrated portion 900 includes a window comparator 920 and a high-speed digital processor 930 that can correspond to the window comparator 820 and the high-speed processor 830, respectively, of FIG. 8. The window comparator 920 can include a first comparator 901, a second comparator 902, an inverter 904, an input node 905, and a reference node 906. The high-speed processor 930 can be implemented by an OR gate 903 having an output coupled to an output node 907.

The first comparator 901 has a non-inverting input 901a coupled to the input node 905, an inverting input 901b coupled to the reference node 906, and an output coupled to a first input 903a of the OR gate 903. The second comparator 902 has a non-inverting input 902a coupled to the output of the inverter 904, an inverting input 902b coupled to the input node 905, and an output coupled to a second input 903b of the OR gate 903. The OR gate 903 has first and second inputs 903a, 903b, and an output 903c coupled to the output node 907. The inverter 904 has an input coupled to the reference node 906, and an output coupled to the non-inverting input 902a of the second comparator 902.

In one embodiment, the window comparator 920 and the high-speed processor 930 can be used for the adaptation of the programmable gain amplifier 870. In such an embodiment, the multiplexer 810 can select the PGA output signal $V_{PGA}$ from the PGA 870, and provide it to the input node 905 as the comparator input signal S1 (FIG. 8). The PGA output signal $V_{PGA}$ is compared with a programmable voltage threshold $V_{REF}$ using the first and second comparators 901, 902. In the illustrated embodiment, the programmable voltage threshold $V_{REF}$ is a positive analog voltage and is provided as an input to the inverting input 901b of the first comparator 901. Also in the illustrated embodiment, the programmable voltage threshold $V_{REF}$ is amplified with a gain of −1 by the inverter 904 and the inverted result ($-V_{REF}$) is provided as an input to the non-inverting input 902a of the second comparator 902. In alternative embodiments, both positive and negative voltages can be provided for the programmable voltage threshold $V_{REF}$, a negative reference voltage can be provided and inverted, or the like. The output signals from the comparators 901, 902 are combined into the OR gate 903 (the input amplitude cannot simultaneously be higher than $+V_{REF}$ and lower than $-V_{REF}$).

The output signal S3 of the OR gate 903 is asserted (high) when the amplitude of the PGA output signal $V_{PGA}$ is greater than or equal to the programmable voltage threshold $V_{REF}$ ($|V_{PGA}(t)| \geq V_{REF}$), and it is deasserted (low) otherwise. Accordingly, the output signal S3 changes state when the PGA output signal $V_{PGA}$ transitions from above $+V_{REF}$ to below $+V_{REF}$, from below $+V_{REF}$ to above $+V_{REF}$, from below $-V_{REF}$ to above $-V_{REF}$, or from above $-V_{REF}$ to below $-V_{REF}$. However, the output signal S3 remains low when the PGA output signal $V_{PGA}$ transitions between $+V_{REF}$ and $-V_{REF}$. Therefore, when the amplitude of the envelope of the PGA output signal $V_{PGA}$ is less than the voltage threshold $V_{REF}$, the output signal S3 will be low. By contrast, when the amplitude of the envelope of the PGA output signal $V_{PGA}$ is higher than the voltage threshold $V_{REF}$, the output signal S3 should be a series of pulses having a data rate that is equal to the PGA input bit-stream data rate.

Figure 10A:
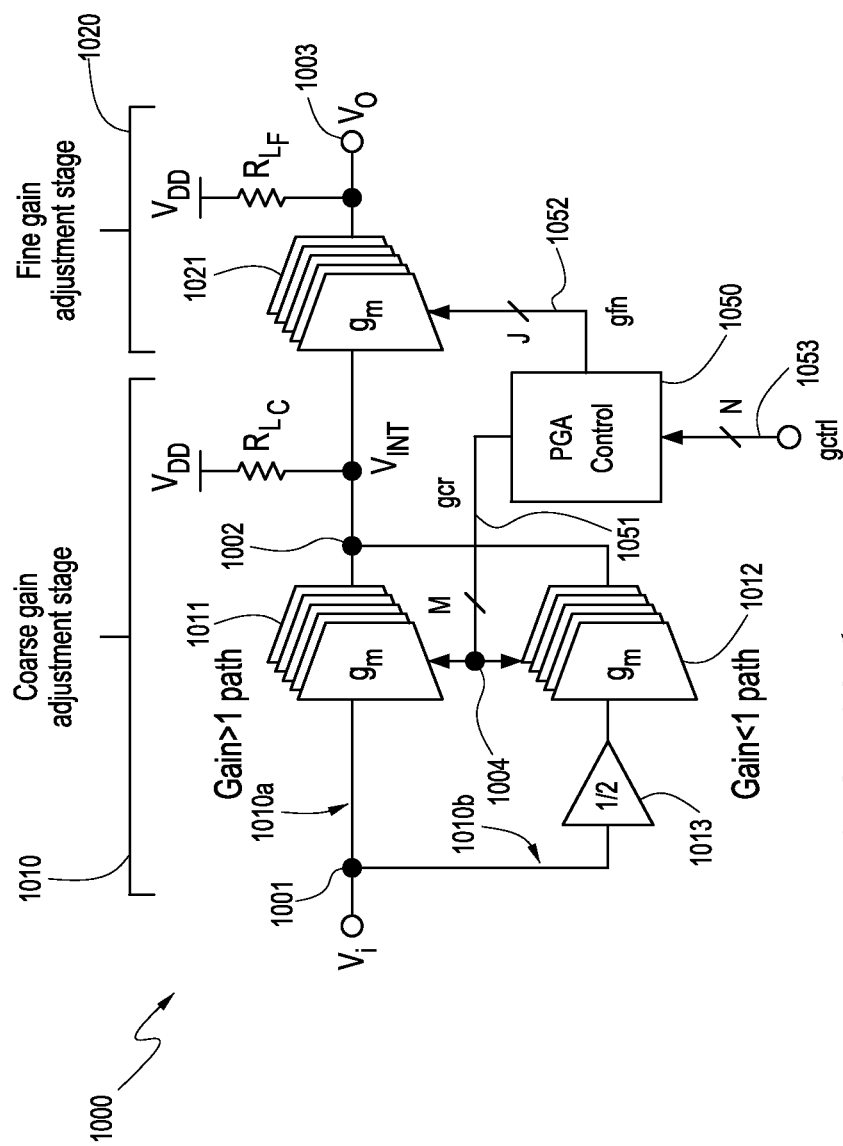
FIG. 10A is a schematic block diagram of a programmable gain amplifier block according to one embodiment.

Referring to FIG. 10A, a programmable gain amplifier (PGA) according to one embodiment will now be described. The illustrated PGA 1000 can be used for the PGA 870 of FIG. 8. The PGA 1000 can include a coarse gain adjustment stage 1010 and a fine gain adjustment stage 1020 cascaded with each other.

The coarse gain adjustment stage 1010 serves to receive an input voltage signal Vi and amplifies it with a first gain to provide an intermediate voltage signal $V_{INT}$. The fine gain adjustment stage 1020 serves to further amplify the intermediate voltage signal $V_{INT}$ with a second gain. The coarse gain adjustment stage 1010 provides a gain that roughly matches with a desired gain, and the fine gain adjustment stage 1020 provides a fine tuning of the gain to match with the desired gain.

In the illustrated embodiment, the coarse gain adjustment stage 1010 includes a first path 1010a and a second path 1010b. The first path 1010a can provide a gain that is greater than or equal to 1, whereas the second path 1010b provides a gain that is smaller than 1 (loss). Either the first or second path 1010a, 1010b is enabled, depending on the desired gain. The first path 1010a is used when PGA gains equal to or higher than unity (1) are used. The second path 1010b is used when PGA gains lower than unity are used. In alternative embodiments, the gain of the paths 1010a, 1010b can overlap. In other embodiments, the gain of the paths 1010a, 1010b can have different gain ranges, at least parts of which do not overlap. In an alternative embodiment, the first path 1010a can provide a gain that is greater than 1, whereas the second path 1010b provides a gain that is equal to or smaller than 1.

The first path 1010a can include a plurality of first transconductance units 1011 electrically coupled in parallel between a first node 1001 and a second node 1002. The first node 1001 can also be referred to as an input node, and the second node 1002 can also be referred to as an intermediate node in the context of this embodiment. The number of the first transconductance units 1011 can be M, where M is an integer equal to or greater than 2. Each of the first transconductance units 1011 can have an input coupled to the first node 1001, and an output coupled to the second node 1002. In one embodiment, the first transconductance units 1011 can have the same configuration as each other, that is, the units 1011 can be instantiated. In another embodiment, at least two of the first transconductance units 1011 can have different configurations from each other.

The second path 1010b includes a scale-down amplifier 1013 with a gain smaller than 1, and a plurality of second transconductance units 1012. The scale-down amplifier 1013 can have an input coupled to the first node 1001 and an output, and can have a gain of less than 1, such as, for example, ½.

The plurality of second transconductance units 1012 can be electrically coupled in parallel between the output of the scale-down amplifier 1013 and the second node 1002. Each of the second transconductance units 1012 can have an input coupled to the output of the scale-down amplifier 1013, and an output coupled to the second node 1002. The number of the second transconductance units 1012 can be the same as the number of the first transconductance units 1011, and thus can be M, where M is an integer equal to or greater than 2. In other embodiments, the number of the second transconductance units 1012 can be different from the number of the first transconductance units 1011. In one embodiment, the second transconductance units 1012 can have the same configuration as one another. In another embodiment, at least two of the second transconductance units 1012 can have different configurations from each other.

The fine gain adjustment stage 1020 can include a plurality of third transconductance units 1021 electrically coupled in parallel between the second node 1002 and a third node 1003. The third node 1003 can also be referred to as an output node in the context of this embodiment. Each of the third transconductance units 1021 can have an input coupled to the second node 1002, and an output coupled to the third node 1003. The number of the third transconductance units 1021 can be J, where J is an integer equal to or greater than 2. J can be different from M. In another embodiment, J can be the same as M. In one embodiment, the third transconductance units 1021 can have the same configuration as one another. In another embodiment, at least two of the third transconductance units 1021 can have different configurations from each other.

The PGA 1000 can also include a coarse load resistor $R_{LC}$ to aggregate and collect current outputs from the transconductance units 1011, 1012. The PGA 1000 can also include a fine load resistor $R_{LF}$ to aggregate and collect current outputs from the third transconductance units 1021.

The PGA 1000 can further include a PGA control 1050 that receives one or more gain control codes embedded in the gain control gctrl from the gain control block 860 (FIG. 8). The PGA control 1050 serves to provide one or more digital gain control signals gcr, gfn to the transconductance units 1011, 1012, 1021. The one or more digital gain control signals gcr, gfn are used to synthesize a desired overall gain of the PGA 1000 by selectively turning on or off a finite and discrete number of the transconductance units 1011, 1012, 1021.

The PGA control 1050 can decode the gain control signal gctrl from the gain control block 860 (FIG. 8) via a control bus 1053. The gain control signal gctrl can be encoded in simple binary form. The PGA control 1050 can provide first gain control signals gcr[M:1] via a first bus 1051 to the first and second transconductance units 1011, 1012, and second gain control signals gfn[J:1] via a second bus 1052 to the third transconductance units 1021. In the illustrated embodiment, the PGA control 1050 is part of the PGA 1000. In another embodiment, the PGA control 1050 can be implemented in combinational logic, and can be placed within the gain control block 860 (FIG. 8).

Each bit in the first and second buses 1051, 1052 can indicate whether a particular transconductance unit is to be enabled (on) or disabled (off). If x represents the maximum number of transconductance units that can be simultaneously enabled in the fine gain adjustment stage 1020, monotonicity of the PGA gain versus gain code curve can be obtained by making $g_{mc}$ equal to or greater than $x \cdot g_{mf}$ ($g_{mc} \geq x \cdot g_{mf}$), where $g_{mc}$ denotes the transconductance of each of the units in the coarse gain adjustment stage 1010, and $g_{mf}$ denotes the transconductance of each of the units in the fine gain adjustment stage 1020. In one embodiment, the transconductances $g_{mc}$ and $g_{mf}$ are substantially constant for all the units.

Figure 10B:
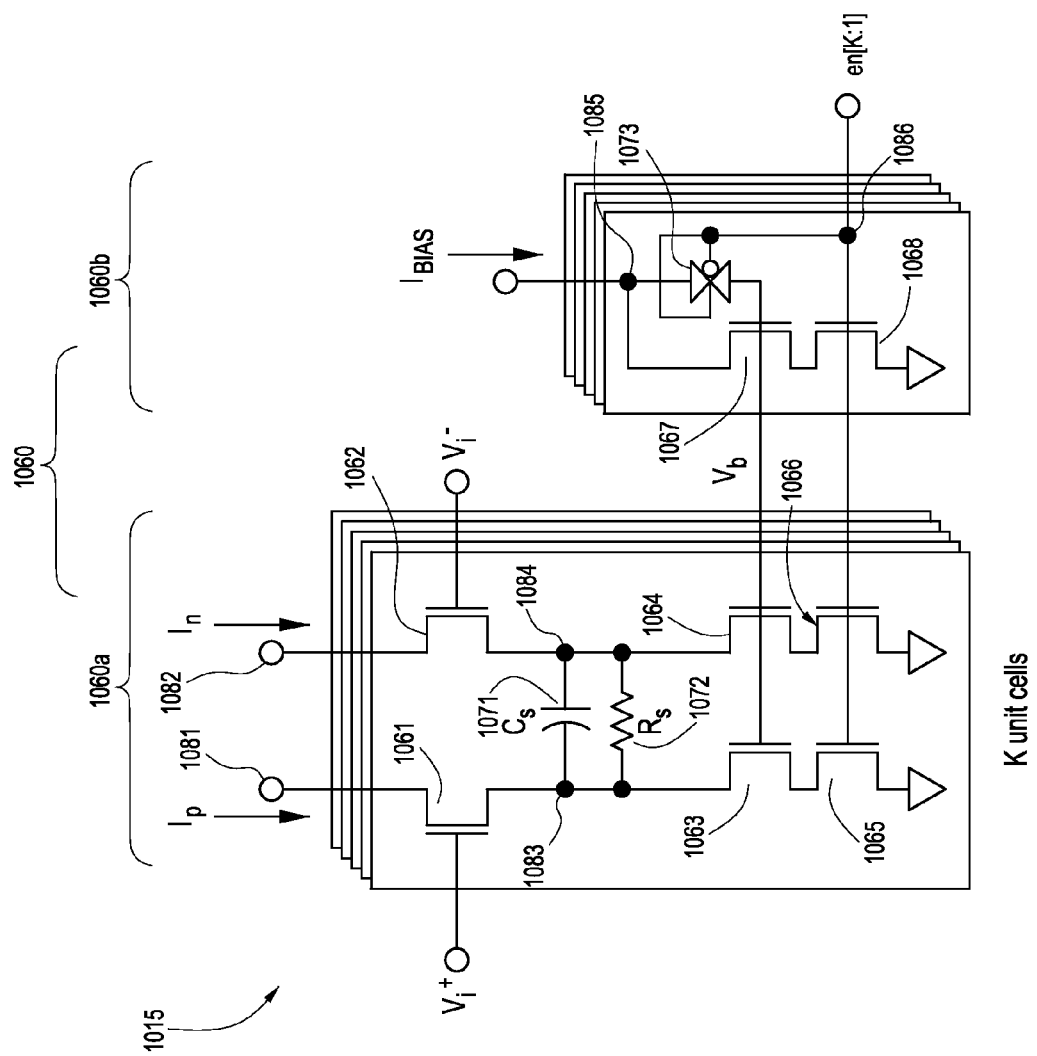
FIG. 10B is a schematic block diagram of a programmable gain amplifier stage according to one embodiment.

Referring to FIG. 10B, a voltage-mode, differential CMOS implementation of an amplification stage according to one embodiment will be described below. The illustrated amplification stage 1015 can be used to replace at least one of (1) the entirety of the plurality of the first transconductance units 1011, (2) the entirety of the plurality of the second transconductance units 1012, or (3) the entirety of the plurality of the third transconductance units 1021 (FIG. 10A).

The amplification stage 1015 can have K number of unit cells 1060, each of which includes a first portion 1060a and a second portion 1060b, where K is an integer equal to or greater than 2. For the coarse gain adjustment stage 1010 of FIG. 10A, K can be M. For the fine gain adjustment stage 1020 of FIG. 10B, K can be J.

Each of the first portions 1060a can include first to sixth transistors 1061-1266, a degeneration source capacitor 1071, a degeneration source resistor 1072, and first to fourth nodes 1081-1084. Each of the second portions 1060b can include seventh and eighth transistors 1067, 1068, a pass gate or transmission gate 1073, and fifth and sixth nodes 1085, 1086.

The first transistor 1061 can be an NMOS transistor that has a source coupled to the third node 1083, a drain coupled to the first node 1081, and a gate to receive a non-inverting component Vi$^+$ of a differential voltage input Vi. The second transistor 1062 can be an NMOS transistor that has a source coupled to the fourth node 1084, a drain coupled to the second node 1082, and a gate to receive an inverting component Vi$^-$ of the differential voltage input Vi.

The third transistor 1063 can be an NMOS transistor that has a source, a drain coupled to the third node 1083, and a gate coupled to the pass gate 1073. The fourth transistor 1064 can be an NMOS transistor that has a source, a drain coupled to the fourth node 1084, and a gate coupled to the pass gate 1073.

The fifth transistor 1065 can be an NMOS transistor that has a source coupled to a voltage reference such as ground, a drain coupled to the source of the third transistor 1063, and a gate coupled to the sixth node 1086. The sixth transistor 1066 can be an NMOS transistor that has a source coupled to the voltage reference such as ground, a drain coupled to the source of the fourth transistor 1064, and a gate coupled to the sixth node 1086.

The degeneration source capacitor 1071 can have a first terminal coupled to the third node 1083 and a second terminal coupled to the fourth node 1084. The degeneration source resistor 1072 can have a first end coupled to the third node 1083 and a second end coupled to the fourth node 1084.

The seventh transistor 1067 can be an NMOS transistor that has a source, a drain coupled to the fifth node 1085, and a gate coupled to the pass gate 1073. The eighth transistor 1068 can be an NMOS transistor that has a source coupled to the voltage reference such as ground, a drain coupled to the source of the seventh transistor 1067, and a gate coupled to the sixth node 1086. The sixth node 1086 is coupled to an enable bus en[K:1]. In other embodiments, at least one of the first to eighth transistors 1061-1068 can be replaced with a PMOS transistor or a bipolar junction transistor with a modified circuit configuration.

The pass gate 1073 can include a parallel combination of an NMOS transistor and a PMOS transistor. The pass gate 1073 can have an input coupled to the gate of the seventh transistor 1067 and an output coupled to the fifth node 1085. The NMOS transistor of the pass gate 1073 can have a gate, and the PMOS transistor of the pass gate 1073 can have a gate coupled to the gate of the NMOS transistor of the pass gate 1073. The pass gate 1073 can have an inverter driving the gate of the PMOS transistor of the pass gate 1073.

During operation, the first and second transistors 1061, 1062 form a source-degenerated differential pair that generates a differential output current $I_p - I_n$. The degeneration source resistor 1072 is used to increase the input voltage range in which the differential pair behaves approximately linearly. The degeneration source capacitor 1071 is used to increase the bandwidth of the stage, compensating mainly for parasitic load capacitors at the stage's output.

The fifth, sixth, and eighth transistors 1065, 1066, 1068 can serve as on/off "foot" switches that allow the unit cells to be enabled or disabled, depending on the state of the corresponding bit from the enable bus en[K:1]. In the illustrated embodiment, when the bit is a logic one (high), the associated unit is enabled. When the bit is a logic zero (low), the associated unit is disabled.

The third, fourth, and seventh transistors 1063, 1064, and 1067 can serve to provide a bias for the stage. The seventh transistor 1067 is diode-connected when the unit cell is enabled, and forms the input of a current mirror. The third and fourth transistors 1063, 1064 are substantially identical to each other, and form the output of the current mirror. In one embodiment, the current mirror ratio is unity. However, in alternative embodiments, the current mirror can be scaled.

Each differential pair (for example, the first and second transistors 1061, 1062, the third and fourth transistors 1063, 1064, or the fifth and sixth transistors 1065, 1066) in each of the first portions 1060a can be enabled/disabled in conjunction with its diode-connected seventh transistor 1067 in the second portion 1060b.

A bias current $I_{BIAS}$ provided to the fifth node 1085 can be evenly distributed among the enabled diode-connected transistors 1067 of the second portions 1060b, and thus the total current ($I_p$, $I_n$, and $I_{BIAS}$) of the amplification stage 1015 is $I_{stage}=3 \cdot I_{BIAS}$ (with unity current mirror ratio). Therefore, the supply current of the amplification stage 1015 is substantially constant, regardless of the selected gain, i.e., regardless of the number of unit cells 1060 that are enabled. The bias voltage Vb is common to the first portions 1060a including differential pairs of transistors. If k denotes the number of unit cells 1060 that are enabled, the tail current of each differential pair is $I_T=(2 \cdot I_{BIAS}/k)$, which indicates that the transconductance is a function of the number of unit cells 1060 that are enabled.

In one extreme, when a relatively large number of the unit cells 1060 are enabled, the transconductance of each of the unit cells 1060 is roughly proportional to the square root of the tail current $I_T$, as expressed in Equation (3).

$$G_m(k)=g_m(k) \approx \sqrt{2 \cdot (W/L) \cdot \mu_n \cdot C_{OX} \cdot (I_{BIAS}/k)} \quad \text{Equation (3)}$$

In Equation (3), $G_m$ is the overall differential pair transconductance, $g_m$ is the transistor transconductance, W is the width of a transistor channel, L is the length of the transistor channel, $\mu_n$ is electron mobility and $C_{OX}$ is the gate capacitance density. Therefore, at this extreme, the overall stage transconductance can have a dependency on a term expressed in Equation (4) below.

$$k \cdot \sqrt{(I_{BIAS}/k)} = \sqrt{k \cdot I_{BIAS}} \quad \text{Equation (4)}$$

At the other extreme, when a relatively small number of unit cells 1060 are enabled, the product $g_m \cdot Rs$ is substantially greater than 1 ($g_m \cdot Rs \gg 1$). Thus, the equivalent transconductance of the unit cell can be expressed in Equation (5) below.

$$G_m(k) \approx 1/(1+(g_m+g_{mb}) \cdot R_S) \approx 1/R_S \quad \text{Equation (5)}$$

In Equation (5), variable $g_{mb}$ is the back-gate transconductance of one of the differential pair transistors, assuming that all the transistors are placed in the same substrate or well. If each transistor has its own well, then $g_{mb}$ is 0. Therefore, at this extreme, the overall stage transconductance can depend roughly on $k/R_s$.

It follows that to make the amplification stage transconductance $G_m(k)$ linear as a function of the gain code, the number of unit cells added per gain code increment should be increased as the gain code increases. For example, for gain codes 2, 3, 4, 5, . . . 13, 14, or 15, the number of unit cells enabled could be 2, 3, 4, 6, . . . , 18, 25, or 35 so that the number of unit cells added per step are 1, 1, 2, . . . , 7, or 10. The actual number of unit cells added per gain code step can depend on the specifics of the implementation of the unit cells such as fabrication process used, target power dissipation, silicon area, and the like.

The above-described PGA architecture can have the following main advantages. A two-stage amplification path for gains higher than unity or around unity can increase the speed of the system. For a given power dissipation, an exponentially increasing number of cells is needed to implement a large gain since the total transconductance has a square root dependence on the number of unit cells (individual differential pairs) when several unit stages are enabled. The input node of a single-stage amplification system would therefore have a much larger capacitive load than any single node in a two-stage amplification system.

In the embodiment of FIG. 10A, dedicated paths for relatively low gain (loss) and relatively high gain can improve the linearity of both paths since each has a smaller input range. Additionally, a dedicated path for a gain lower than unity allows for handling of large input signal amplitudes which are typically present in specialized scenarios such as compliance testing. For example, for a typical 0.18 µm process, $V_{DD}$ can be about 1.8 V and the maximum HDMI single-ended amplitude can be about 600 mV, or 33% of the available head-room.

Figure 11:
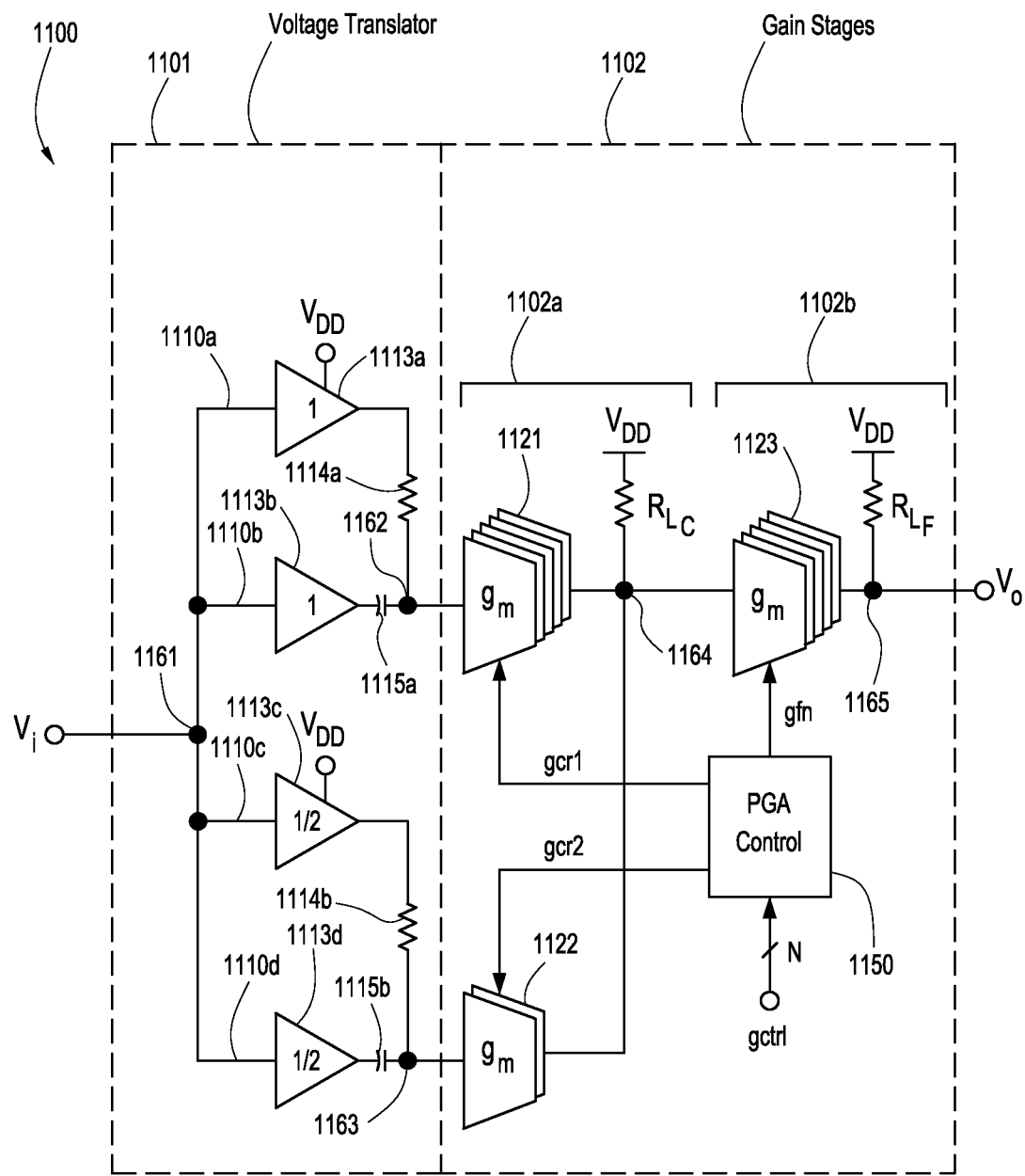
FIG. 11 is a schematic block diagram of a programmable gain amplifier block according to another embodiment.

Referring to FIG. 11, a programmable gain amplifier (PGA) according to another embodiment will be described below. The illustrated PGA 1100 can be used for the PGA 870 of FIG. 8. The PGA 1100 can include a voltage translator 1101 and a gain stage 1102.

The voltage translator 1101 can include first to fourth paths 1110a-1110d. The first path 1110a can include a first unity-gain amplifier 1113a and a first resistor 1114a coupled in series between a first node 1161 and a second node 1162. The second path 1110b can include a second unity-gain amplifier 1113b and a first capacitor 1115a coupled in series between the first node 1161 and the second node 1162. The third path 1110c can include a first scale-down amplifier 1113c and a second resistor 1114b coupled in series between the first node 1161 and a third node 1163. The fourth path 1110d can include a second scale-down amplifier 1113d and a second capacitor 1115b coupled in series between the first node 1161 and the third node 1163. The first and second scale-down amplifiers 1113c, 1113d can have a gain lower than 1, for example, ½. Other applicable gain (loss) values will be readily determined by one of ordinary skill in the art. The amplifiers 1113a-1113d can be powered by a voltage supply $V_{DD}$ having a voltage of, for example, about 1.8 V.

The first path 1110a and the second path 1110b can be used when the gain of the PGA 1100 needs to be equal to or greater than 1. The first path 1110a can be used when the input signal has a relatively low frequency, for example, about 0 Hz to about 10 MHz. The first path 1110a has a low pass filter formed by the first resistor 1114a and the first capacitor 1115a at its output. The second path 1110b can be used when the input signal has a relatively high frequency, for example, about 10 MHz to about 10 GHz. The upper limit of the frequency range of the second path 1110b can be determined by parasitic components of the circuit. The second path 1110b has a high pass filter formed by the first resistor 1114a and the first capacitor 1115a at its output.

The third path 1110c and the fourth path 1110d can be used when the gain of the PGA 1100 needs to be lower than 1. The third path 1110c can be used when the input signal has a relatively low frequency, for example, about 0 Hz to about 10 MHz. The third path 1110c has a low pass filter formed by the second resistor 1114b and the second capacitor 1115b at its output. The fourth path 1110d can be used when the input signal has a relatively high frequency, for example, about 10 MHz to about 10 GHz. The upper limit of the frequency range of the fourth path 1110d can be determined by parasitic components of the circuit. The fourth path 1110d has a high pass filter formed by the second resistor 1114b and the second capacitor 1115b at its output. In alternative embodiments, the first path and second path 1110a, 1110b can be used when the gain of the PGA 1100 needs to be greater than 1 whereas the third path 1110c and the fourth path 1110d can be used when the gain of the PGA 1100 needs to be equal to or lower than 1.

The gain stage 1102 can include a coarse gain adjustment stage 1102a and a fine gain adjustment stage 1102b cascaded with each other. In the illustrated embodiment, the coarse gain adjustment stage 1102a includes a plurality of first transconductance units 1121 electrically coupled in parallel between the second node 1162 and a fourth node 1164, and a plurality of second transconductance units 1122 electrically coupled in parallel between the third node 1163 and the fourth node 1164. The number of the second transconductance units 1122 can be different from the number of the first transconductance units 1121. In other embodiments, the number of the second transconductance units 1122 can be the same as the number of the first transconductance units 1121. The fine gain adjustment stage 1102b can include a plurality of third transconductance units 1123 electrically coupled in parallel between the fourth node 1164 and a fifth node 1165.

The PGA 1100 can also include a coarse load resistor $R_{LC}$ to aggregate and collect current outputs from the transconductance units 1121, 1122. The PGA 1100 can also include a fine load resistor $R_{LF}$ to aggregate and collect current outputs from the third transconductance units 1123.

The PGA 1100 can further include a PGA control 1150 that receives a gain control signal gctrl from the gain control block 860 (FIG. 8). The PGA control 1150 serves to provide digital gain control signals to synthesize a desired gain of the PGA 1100 by selectively turn on or off a finite and discrete number of the transconductance units 1121, 1122, 1123. The PGA control 1150 can provide separate control signals gcr1, gcr2, gfn to the first to third transconductance units 1121, 1122, 1123, respectively. Other details of the gain stage 1102 can be as described above in connection with FIGS. 10A and 10B.

Method of Adapting Programmable Gain Amplifier

In one embodiment, a programmable gain amplifier (PGA) of an equalizer of a receiver can be digitally controlled to adjust the gain of the PGA. For example, the PGA 1000 of FIG. 10A or the PGA 1100 of FIG. 11 can be digitally controlled, using gain codes associated with the voltage gain transfer function of the PGA. In one embodiment, the voltage gain of a PGA is increased monotonically as the gain code increases from 0 to a selected maximum (for example, a (power of 2)−1, such as 31). The selected maximum can vary in a very broad range depending on application.

As described earlier in connection with FIG. 9, in the equalizer 800 of FIG. 8, if the amplitude of the envelope of the PGA output signal is less than a voltage threshold $V_{REF}$, the output signal of the digital processor 830 (FIG. 8) remains low. If the amplitude of the envelope of the PGA output signal is greater than the voltage threshold $V_{REF}$, the output signal of the digital processor 830 can be a series of pulses with a data rate equal to the PGA input bit-stream data rate.

In adapting the gain of the PGA, the digital controller 860 (FIG. 8) can determine whether the amplitude of the envelope of the PGA output signal has been adjusted properly, by detecting the number of pulses from the digital processor 830. In one embodiment, the gain of a PGA is initially set at its lowest gain. A counter is used to count the number of pulses from the digital processor 830 for a particular period of time. If the number of pulses detected during the selected period is less than a selected number (which can indicate that the amplitude envelope of the PGA output signal is sufficiently high), the gain of the PGA is considered to be lower than desired. The next highest gain setting is selected, and these steps are repeated until a desired amplitude envelope is obtained. The number of pulses that should be detected for the selected period of time will vary in a very broad range depending on the application and will be readily determined by ordinary skill in the art.

Figure 12:
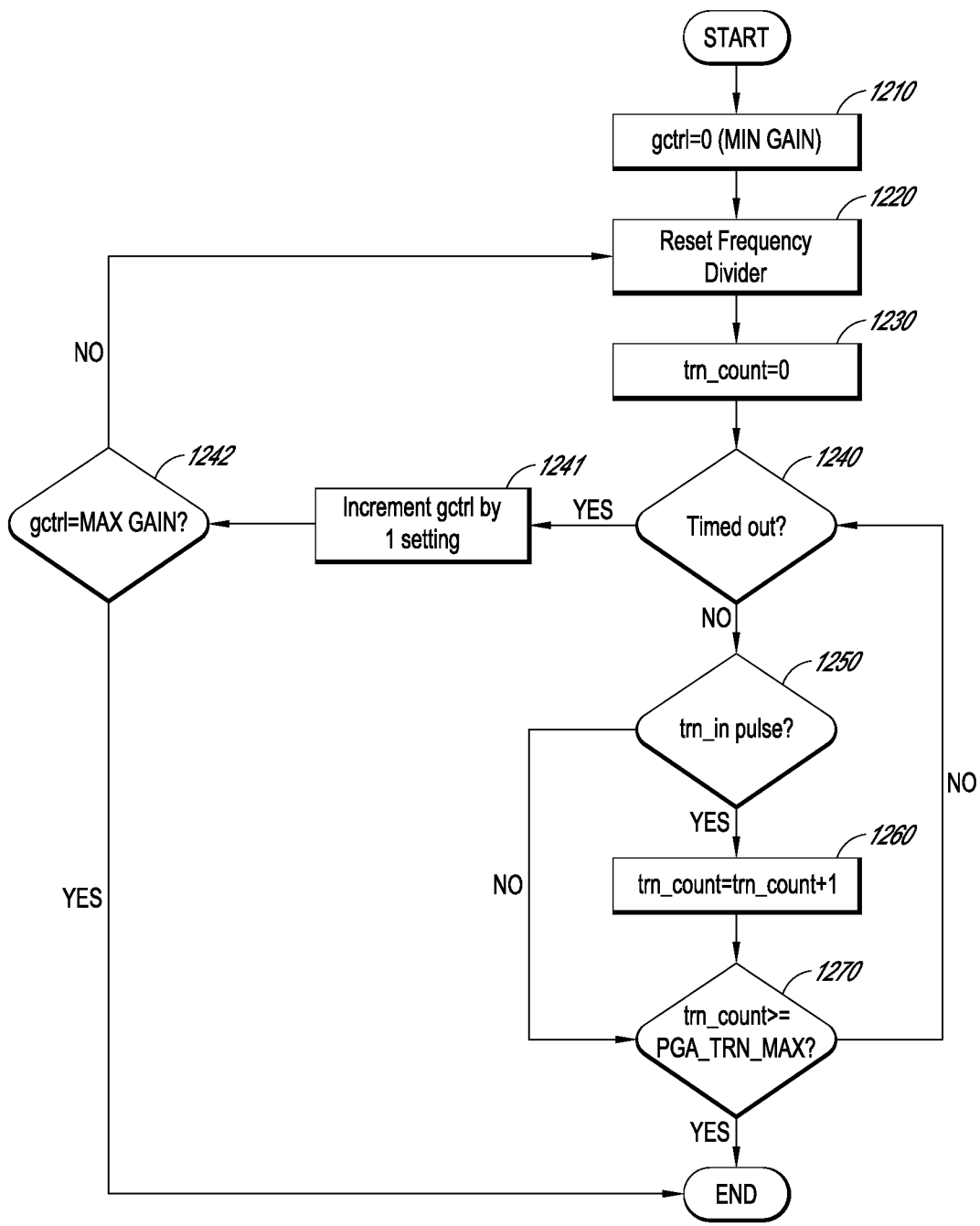
FIG. 12 is a flowchart illustrating a method of adapting a programmable gain amplifier according to one embodiment.

Referring to FIGS. 8, 10A, and 12, a process for PGA gain adaptation according to one embodiment will be described in more detail below. At the block 1210, the PGA gain control code (gctrl) is initially set at its lowest setting, for example, gctrl=0. At the block 1220, the frequency divider 840 (FIG. 8) is reset. At the block 1230, the number (trn_count) of trn_in pulses (S5 in FIG. 8) is set to 0 (trn_count=0). A counter can be used to count the number of trn_in pulses received during a period of time. At the decision block 1240, it is determined whether the period of time has elapsed. If the answer is YES, the PGA gain control code (gctrl) is incremented (for increased gain) by 1 setting at the block 1241. If it is determined that gctrl has reached its maximum value, for example, 31 at the decision block 1242, the process is terminated since in the illustrated example, the setting of 31 corresponds to the largest available PGA voltage gain. If it is determined that gctrl is not 31 at the decision block 1242, the process returns to the block 1220.

Returning now to the decision block 1240, if the answer is NO at the decision block 1240, the process proceeds to a decision block 1250 in which it is determined whether there has been a trn_in pulse. If the answer is YES at the decision block 1250, the number of trn_in pulses (trn_count) is increased by 1 at the block 1260. Then, the process advances to a decision block 1270. If the answer is NO at the decision block 1250, the process advances directly to the block 1270.

At the decision block 1270, it is determined if the number of trn_in pulses received during the time period is equal to or greater than a parameter PGA_TRN_MAX, which can be user-programmable through a bus. If the answer is NO at the decision block 1270, the process returns to the decision block 1240. If the answer is YES at the decision block 1270, the process is terminated, with the results that the gctrl setting in use corresponds to the smallest voltage gain for which the amplitude of the envelope of the PGA output signal $V_{PGA}$ exceeds the reference voltage $V_{REF}$.

Digitally-Controlled High-Pass Filter

Figure 13A:
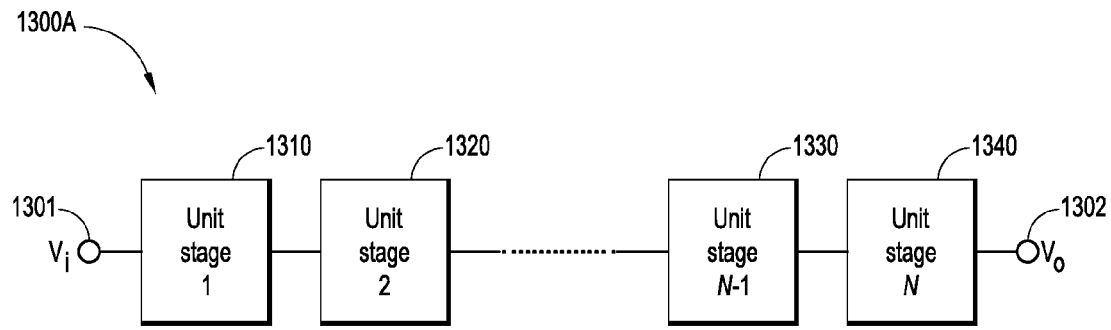
FIG. 13A is a schematic block diagram of a digitally-controlled equalizer according to one embodiment.
Figure 13B:
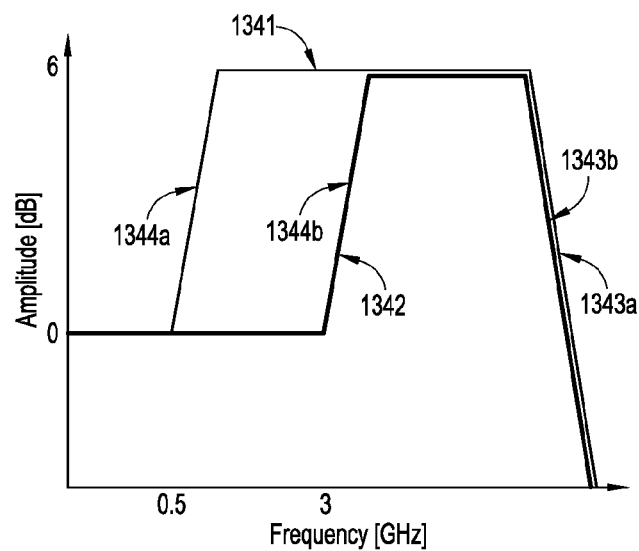
FIG. 13B is a graph illustrating the transfer functions of two unit stages of a digitally-controlled equalizer according to another embodiment.
Figure 13C:
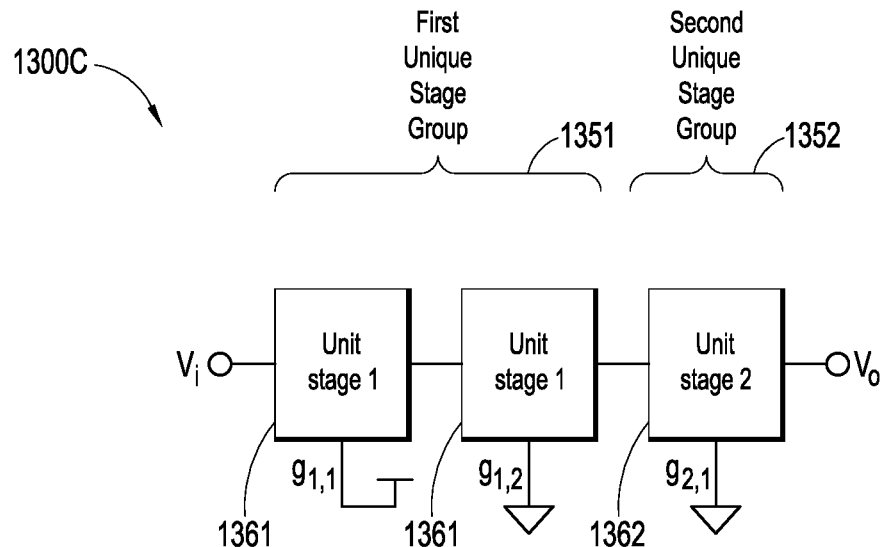
FIG. 13C is a schematic block diagram of unique unit stages in a digitally-controlled equalizer according to another embodiment.

Referring to FIGS. 13A-13C, a high-pass filter for use in an equalizer of a receiver according to one embodiment will be described below. The illustrated high-pass filter (HPF) 1300A can be adapted for the high-pass filter 880 of FIG. 8.

In the illustrated embodiment, the HPF 1300A includes first to N-th unit stages 1310-1340. N can be an integer equal to or greater than 1. The first to N-th unit stages 1310-1340 are cascaded with one another between an input node 1301 and an output node 1302. In an alternative embodiment, the HPF 1300A has only a single unit stage. The input node 1301 can be coupled to the first node N1 of FIG. 8, and the output node can be coupled to the second node N2 of FIG. 8.

In one embodiment, a high-pass filter can include two or more unit stages having the same or different characteristics. Each of the unit stages can have a selected frequency range for a signal to pass through the unit stage or boosted by the unit stage. In some embodiments, two or more unit stages can have different frequency ranges and/or responses, in other words, different high-frequency boosts in boost amount and/ or location from one another. In the context of this embodiment, the term "unique unit stage" refers to such a stage that provides a particular high-frequency boost that is different, in boost amount and/or frequency location, than that of other unit stages in the chain of units in the high-pass filter.

FIG. 13B shows transfer functions of a high-pass filter including two unique unit stages. The high-pass filter can include a first unique unit stage and a second unique unit stage. A first line denoted as 1341 in FIG. 13B indicates a portion of a transfer function of the first unique unit stage. A second line denoted as 1342 in FIG. 13B indicates a portion of a transfer function of the second unique unit stage. The first and second unique unit stages have the same high frequency boost of about 6 dB in amplitude. However, the boost of the first unique unit stage starts at about 0.5 GHz whereas the boost of the second unique unit stage starts at about 3 GHz.

In adapting the high-pass filter, the lines 1343a, 1343b illustrate other portions of the transfer functions of the first and second stages, and are the result of parasitic components of the stages, and typically are not adjustable. By contrast, the lines 1344a, 1344b representing other portions of the transfer functions of the first and second stages can be adjusted.

Referring to FIG. 13C, a high-pass filter for use in an equalizer according to another embodiment will be described below. The illustrated high-pass filter (HPF) 1300C can be adapted for the high-pass filter 880 of FIG. 8. In the illustrated embodiment, the HPF 1300C includes a first unique stage group 1351 and a second unique stage group 1352. The first stage group 1351 includes two of first unit stages 1361, and the second stage group 1352 includes a second unit stage 1362.

Figure 13D:
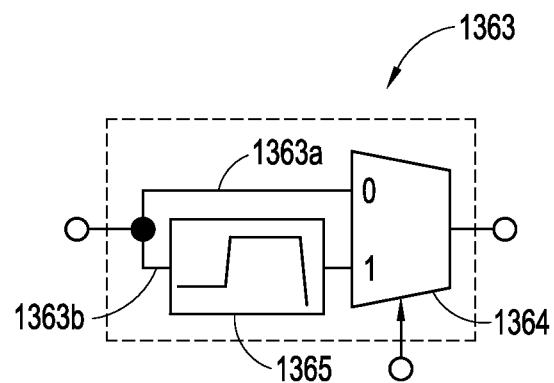
FIG. 13D is a schematic block diagram of a unit stage of a digitally-controlled equalizer according to another embodiment.

Referring to FIG. 13D, each of unit stages in a high pass filter can have first and second operating modes. The first mode is a pass-through mode in which the unit stage has unity gain. The second mode is a boosting mode in which the unit stage provides a high-frequency boost. The amount and frequency location of the boost can depend on the particular implementation of the unit stage.

To implement the first and second modes, each of the unit stages 1361, 1362 of FIG. 13C can have a configuration, as shown in FIG. 13D. The illustrated unit stage 1363 has a first path 1363a for unity gain, and a second path 1363b for a desired transfer function 1365. The unit stage 1363 can also include a multiplexer 1364 to selectively output a signal from the first or second path 1363a, 1363b. During operation, if a specific unit stage is to be selected, the unit stage is selected to use the second path 1363b for providing a boost. If the specific unit stage is not to be selected, the unit stage is selected to use the first path 1363a for providing unity gain.

In one embodiment, a high-pass filter can include two or more unit stages. The number of unit stages in the high-pass filter can be denoted by M. The high-pass filter can include a plurality of the same unique unit stages in its chain to form a unique stage group. Such a group can be referred to as a "stage group" in the context of this document. The number of unit stages in an i-th stage group is denoted by Ki. A set that represents the number of stages in all the stage groups in a high-pass filter can be expressed in Equation (6) below.

$$\mathbb{K} = \{K_1, K_2, \ldots, K_M\} \quad \text{Equation (6)}$$

With M and Ki defined, the total number of stages in the high-pass filter can be calculated as in Equation (7).

$$R = \sum_{i=1}^{M} K_i \quad \text{Equation (7)}$$

The operating mode of a j-th stage within the i-th stage group is controlled by the binary digital signal $g_{i,j}$ as follows.

$$g_{i,j} = \begin{cases} 0, & \text{pass-through mode} \\ 1, & \text{boosting mode} \end{cases}$$

The number of stages configured in boosting mode in the i-th stage group is denoted by Equation (8).

$$k_i = \sum_{i=1}^{K_i} g_{i,j} \quad \text{Equation (8)}$$

In contrast, the number of stages configured in pass-though mode for that same stage group is simply Ki−ki. The set that represents the number of stages configured in boosting mode for all the stage groups in a high-pass filter is denoted by Equation (9).

$$\mathbb{k} = \{k_1, k_2, \ldots, k_m\} \quad \text{Equation (9)}$$

In such a linear system, the order of the stages in the chain is typically not important, and thus the set $\mathbb{k}$ can uniquely define the operating mode of the filter.

Referring back to FIG. 13C, the HPF 1300C can have characteristics expressed in Equation (10) below.

$$M=2, \mathbb{K}=\{K_1,K_2\}=\{2,1\}, R=3, \mathbb{k}=\{k_1,k_2\}=\{g_{1,1}+g_{1,2},g_{2,1}\}=\{1+0,0\}=\{1,0\} \quad \text{Equation (10)}$$

A high-pass filter setting Gi can be a unique combination of stage groups configurations expressed in Equation (11), $$G_i = \{k_1, \ldots, k_M\} \quad \text{Equation (11)}$$

A process of adaptation can be used to choose a particular high-pass filter setting Gi out of the set of available settings, $\mathbb{G}$, depending on the communication channel that is being compensated, using a predefined criteria. Theoretically, there could be a large number of settings |$\mathbb{G}$|, but practically it would only be a small number, for example, about 2 to about 16. Otherwise, selecting the optimal setting for a particular channel could result in long adaptation times and increased silicon area of the digital control.

The order in which the two unique unit stages are placed in the chain is chosen so as to avoid adding unnecessary duty cycle distortion, which would otherwise happen if a small, unequalized signal goes through several unit stages configured in pass-through mode before reaching a unit stage configured in boosting mode. Therefore, it is desirable to provide equalization as early as possible in the chain.

Figure 14:
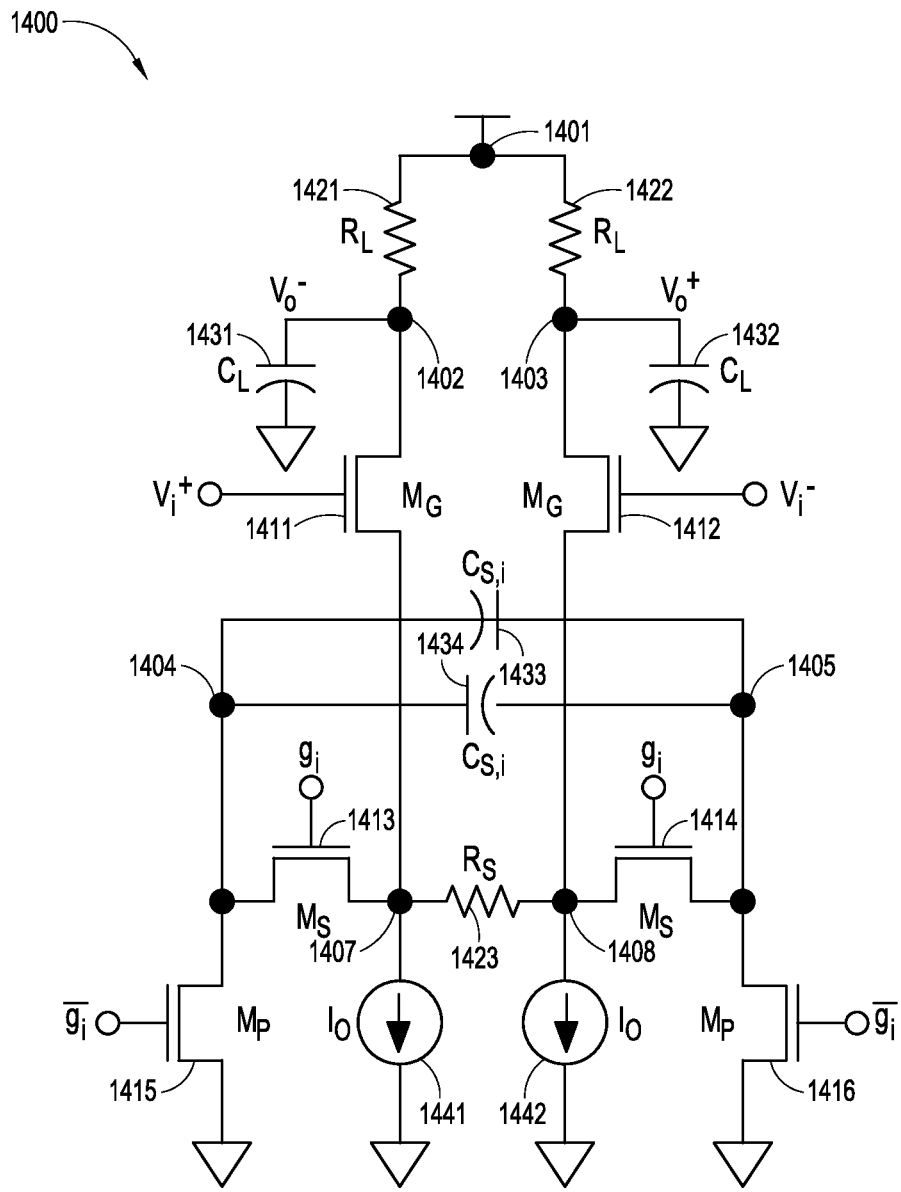
FIG. 14 is a schematic circuit diagram of a high pass filter unit cell according to one embodiment.

Referring to FIG. 14, a high-pass filter (HPF) unit cell according to one embodiment will be described below. The HPF unit cell can form at least part of a unit stage of a high-pass filter. The illustrated HPF unit cell 1400 includes first to fifth nodes 1401-1405, seventh to eighth nodes 1407-1408, first to sixth transistors 1416, first to third resistors 1421-1423, first to fourth capacitors 1431-1434, and first and second current sources 1441, 1442.

The first transistor 1411 can be an NMOS transistor having a source coupled to the seventh node 1407, a drain coupled to the second node 1402, and a gate to receive a non-inverting component $V_i^+$ of a differential voltage input. The second transistor 1412 can be an NMOS transistor having a source coupled to the eighth node 1408, a drain coupled to the third node 1403, and a gate to receive an inverting component $V_i^-$ of the differential voltage input. The third node 1403 is used to output a non-inverting component $V_O^+$ of a differential voltage output. The second node 1402 is used to output an inverting component $V_O^-$ of the differential voltage output.

The third transistor 1413 can be an NMOS transistor having a source coupled to the seventh node 1407, a drain coupled to the fourth node 1404, and a gate to receive a first gain control signal $g_i$. The fourth transistor 1414 can be an NMOS transistor having a source coupled to the eighth node 1408, a drain coupled to the fifth node 1405, and a gate to receive the first gain control signal $g_i$.

The fifth transistor 1415 can be an NMOS transistor having a source coupled to a voltage reference, such as ground, a drain coupled to the fourth node 1404, and a gate to receive a second gain control signal $\overline{g_i}$, which is a complementary version of the first gain control signal gi. The sixth transistor 1416 can be an NMOS transistor having a source coupled to the voltage reference, such as ground, a drain coupled to the fifth node 1405, and a gate to receive the second gain control signal $\overline{g_i}$. In other embodiments, at least one of the transistors 1411-1416 can be replaced with a PMOS or with BJTs with a modified circuit configuration.

The first resistor 1421 can have a first end coupled to the first node 1401 and a second end coupled to the second node 1402. The second resistor 1422 can have a first end coupled to the first node 1401 and a second end coupled to the third node 1403. The third resistor 1423 can have a first end coupled to the seventh node 1407 and a second end coupled to the eighth node 1408.

The first capacitor 1431 can have a first terminal coupled to the second node 1402, and a second terminal coupled to a voltage reference, such as ground. The second capacitor 1432 can have a first terminal coupled to the third node 1403, and a second terminal coupled to the voltage reference. The third capacitor 1433 can have a first terminal coupled to the fifth node 1405, and a second terminal coupled to the fourth node 1404. The fourth capacitor 1434 can have a first terminal coupled to the fourth node 1404, and a second terminal coupled to the fifth node 1405. The capacitances of the third and fourth capacitors 1433, 1434 can be selected, depending on the position or frequency of the line 1344a or 1344b (FIG. 13B) of the transfer function of the unit cell.

The first current source 1441 is coupled between the seventh node 1407 and the voltage reference, such as ground, such that a current flows from the seventh node 1407 to the voltage reference. The second current source 1442 is coupled between the eighth node 1408 and the voltage reference, such as ground, such that a current flows from the eighth node 1408 to the voltage reference.

The first and second transistors 1411, 1412 form a differential pair that has a resistive load by the first and second resistors 1421, 1422 and source degeneration from the third resistor 1423 and the third and fourth capacitors 1433, 1434. When the first gain control signal $g_i$ is a logic high, the third and fourth capacitors 1433, 1434 are connected in parallel with the third resistor 1423 through the third and fourth transistors 1413, 1414 that serve as switching transistors.

The third and fourth capacitors 1433, 1434 can reduce the amount of source degeneration as frequency increases. Thus, the voltage gain of the stage also increases as a function of frequency, and thus high-frequency boost is provided. When the first gain control signal $g_i$ is a logic low $V_{SS}$, the third and fourth capacitors 1433, 1434 are disconnected from the third resistor 1423, and the stage gain is substantially constant across frequency. In one embodiment, it is desirable that this gain is relatively close to unity to implement the pass-through mode.

Method of Adapting High-Pass Filter

In the embodiments described above, a window comparator can be used to detect under-equalized bit streams, i.e., bit streams in which the low-pass filter effects of the communication channel have not been offset well enough to decode the received information with low error probability. In a properly equalized bit stream, each negative bit transition at the high-pass filter output ($V_{HPF}$) should start somewhere above an arbitrary voltage reference $V_{REF}$, which is smaller than the maximum value of the HPF output signal $V_{HPF}$ ($V_{REF}$<max ($V_{HPF}$)), should cross the zero differential voltage point, and should settle below an arbitrary voltage reference $-V_{REF}$. Conversely, each positive bit transition of the HPF output signal $V_{HPF}$ should start somewhere below an arbitrary voltage reference $-V_{REF}$, should cross the zero differential voltage point, and should settle above an arbitrary voltage reference $+V_{REF}$. There can be three general bit sequences that reveal under-equalization.

Figure 15A:
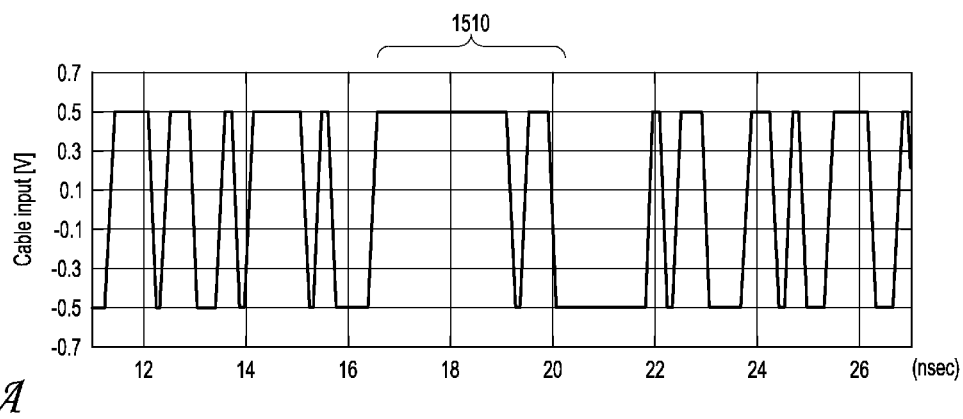
FIGS. 15A and 15B are timing diagrams of a channel input and a high pass filter output, respectively, of a first example under-equalized serial data stream.
Figure 15B:
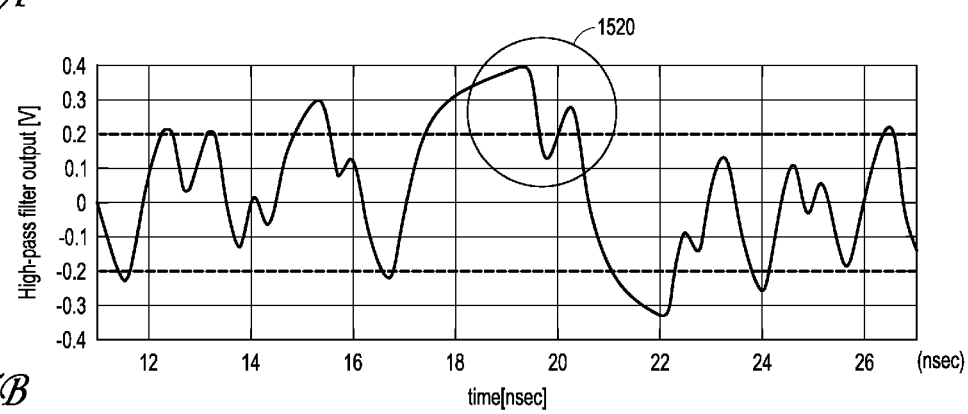

Type 1 sequence: sequences with long strings of logic 1's followed by a short string of logic 0's followed again by more logic 1's. FIGS. 15A and 15B show an example of this situation around 19 nanoseconds (nsec) with the sequence . . . 01111111111111111011 . . . , denoted by the reference numeral 1510 in FIG. 15A. The high-pass filter (HPF) output reaches about 0.4 V at the end of the 16 logic 1's about 0.14 V at the end of the logic 0, and about 0.29 V at the end of the pair of logic 1's as shown in a circle 1520 in FIG. 15B. Thus, if a threshold $V_{REF}$ of, for example, ±0.2 V slices the HPF output, it is possible to detect that there is a logic . . . 101 . . . transition that is under-equalized as the output has consecutive negative and positive transitions through the positive threshold $+V_{REF}$ without crossing the negative threshold $-V_{REF}$ first.

Figure 16A:
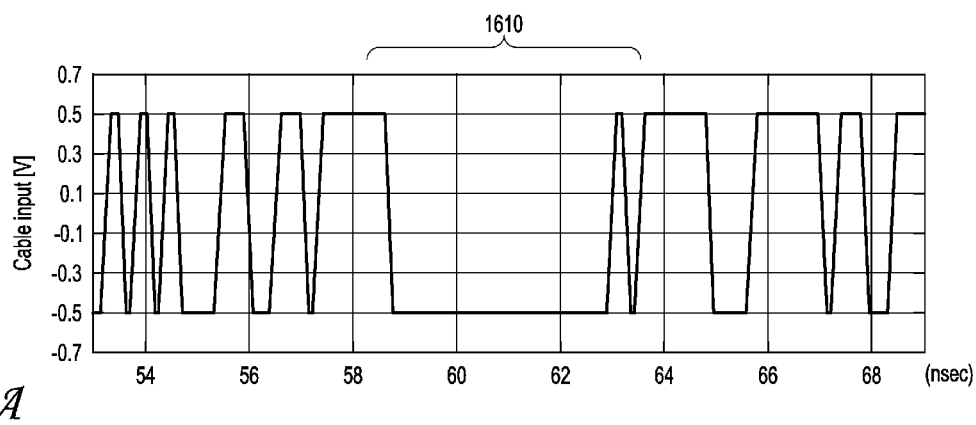
FIGS. 16A and 16B are timing diagrams of a channel input and a high pass filter output, respectively, of a second example under-equalized serial data stream.
Figure 16B:
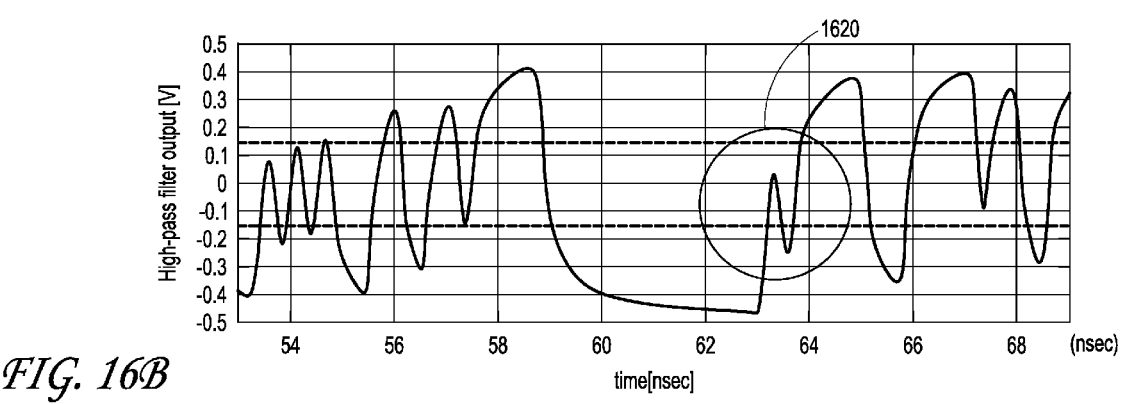

Type 2 sequence: sequences with long strings of logic 0's followed by a short strings of logic 1's followed again by more logic 0's. FIGS. 16A and 16B show an example of this situation around 63 nsec with the sequence . . . 1000000000000000010 . . . , denoted by the reference numeral 1610 in FIG. 16A. A string of 16 logic 0's is followed by a single logic 1 followed by a logic 0. This is almost the mirror image of the Type 1 sequence. A threshold $V_{REF}$ of, for example, ±0.15 V slicing the HPF output can be used to detect that there is a logic . . . 010 . . . transition that is under-equalized as the output has consecutive positive and negative transitions through the negative threshold $-V_{REF}$ without crossing the positive threshold $+V_{REF}$ first, as shown in a circle 1620 in FIG. 16B.

Figure 17A:
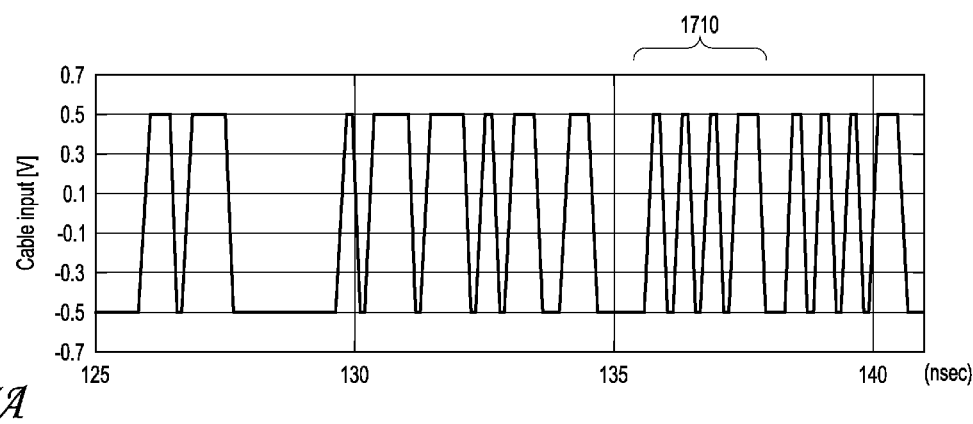
FIGS. 17A and 17B are timing diagrams of a channel input and a high pass filter output, respectively, of a third example under-equalized serial data stream.
Figure 17B:
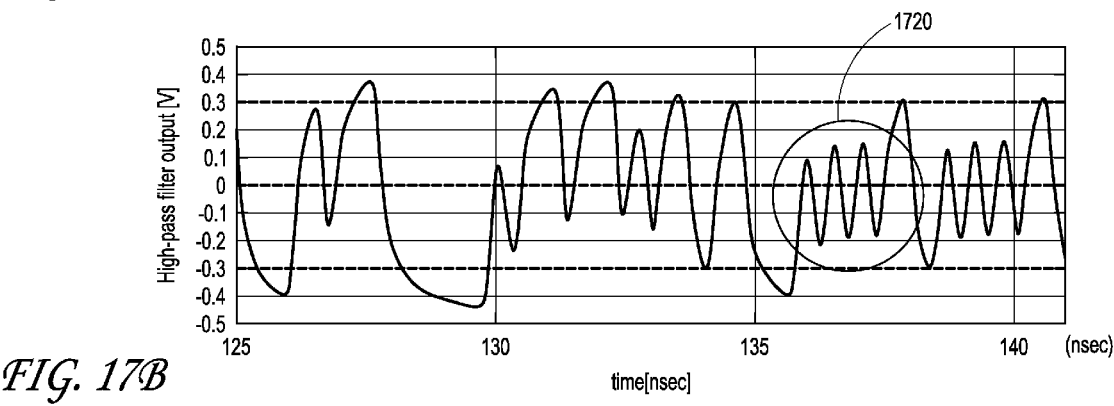

Type 3 sequence: sequences with several logic 0-logic 1 bit pairs (or vice-versa). FIGS. 17A and 17B show an example of this situation around 137 nsec with the sequence . . . 0010101011 . . . ; there are four logic 0-logic 1 pairs . . . , denoted by the reference numeral 1710 in FIG. 17A. In this case, a threshold at zero differential voltage together with thresholds at $\pm V_{REF}$ can be used to detect that there are several . . . 01 . . . transitions that are under-equalized as the HPF output voltage has consecutive positive and negative transitions through the zero threshold without the negative threshold $-V_{REF}$ or positive threshold $+V_{REF}$ being crossed first.

Figure 18:
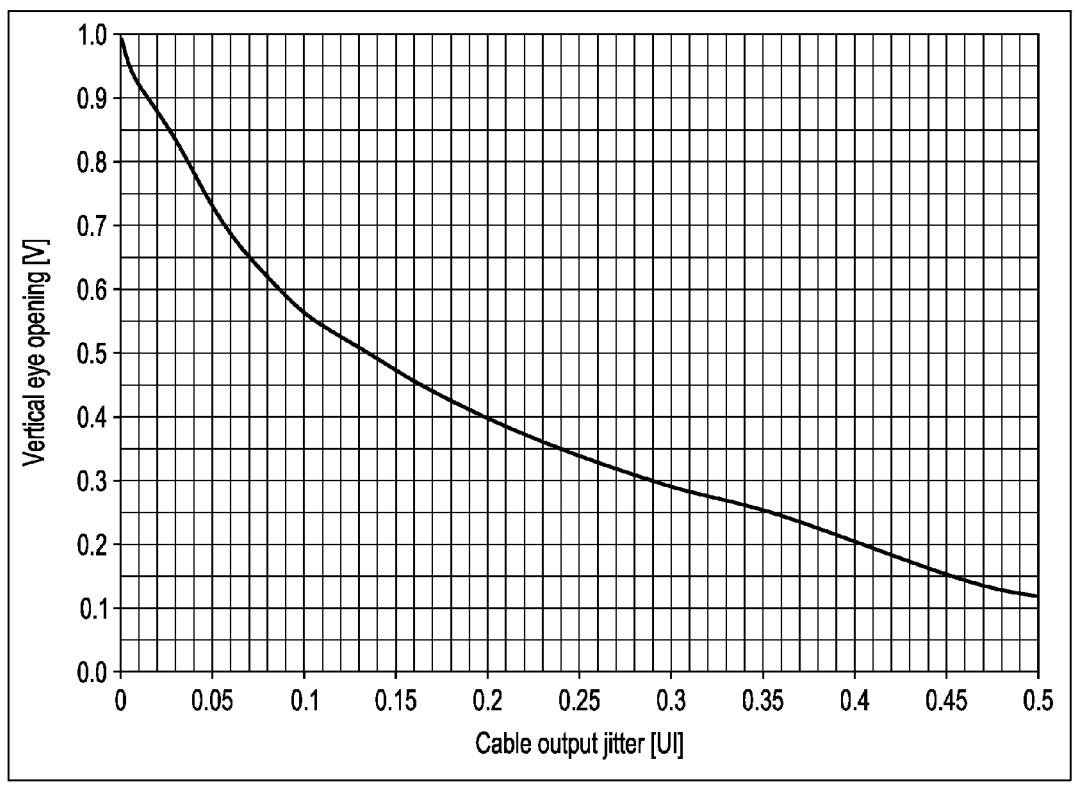
FIG. 18 is a graph illustrating a relationship between cable output jitter and vertical eye opening.

A window comparator can be used to detect under/over equalization because jitter and vertical eye opening are closely related. For example, data eye opening decreases as jitter increases, as shown in FIG. 18, which shows a result that is remarkably constant, regardless of channel length or data rate, for example. In FIG. 18, "UI" represents a unit interval for a bit.

Under-Equalized Bit Stream Detector

Figure 19:
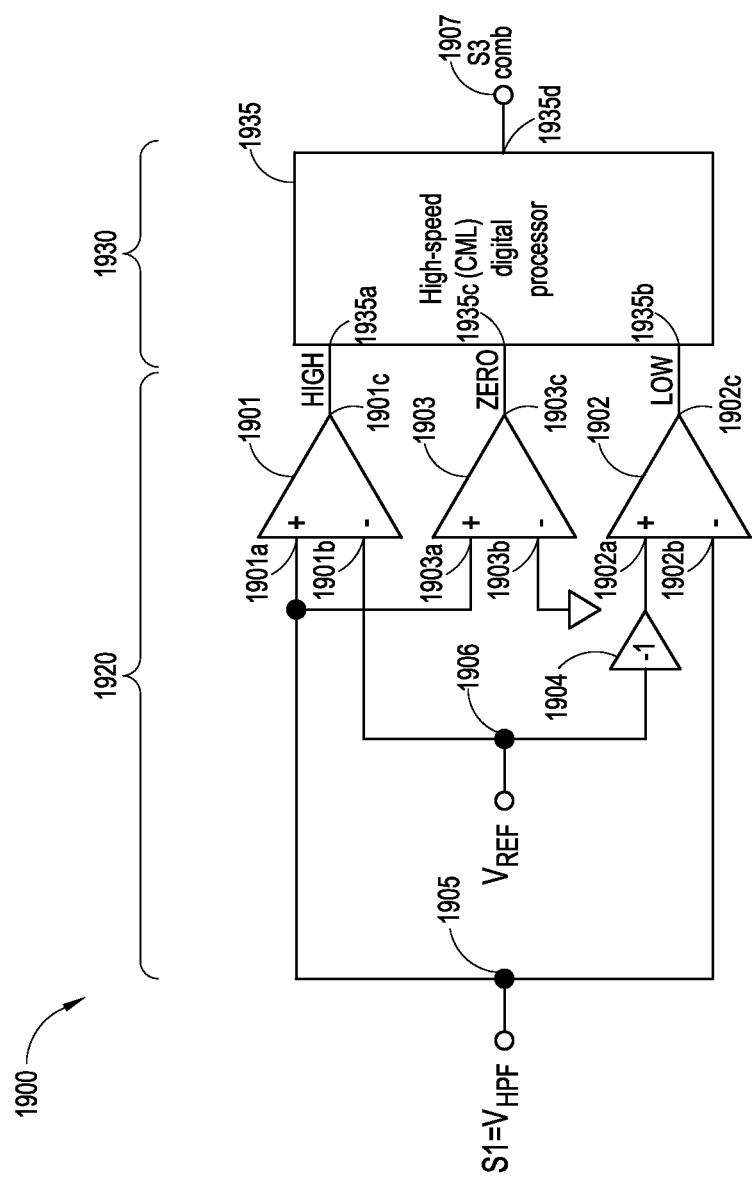
FIG. 19 is a schematic block diagram of a window comparator for high pass filter adaptation according to one embodiment.

Referring to FIG. 19, an under-equalized bit stream detector according to one embodiment will be described below. The illustrated portion 1900 includes a window comparator 1920 and a high-speed digital processor 1930 that can be used as the window comparator 820 and the high-speed processor 830, respectively, of FIG. 8. The window comparator 1920 can include a first comparator 1901, a second comparator 1902, a third comparator 1903, an inverter 1904, an input node 1905, and a reference node 1906. The high-speed processor 1930 can be implemented by, for example, a high-speed current mode logic (CML) digital processor 1935 having an output coupled to an output node 1907.

The first comparator 1901 has a non-inverting input 1901a coupled to the input node 1905, an inverting input 1901b coupled to the reference node 1906, and an output 1901c coupled to a first input 1935a of the digital processor 1935. The second comparator 1902 has a non-inverting input 1902a coupled to the output of the inverter 1904, an inverting input 1902b coupled to the input node 1905, and an output 1902c coupled to a second input 1935b of the digital processor 1935. The third comparator 1903 has a non-inverting input 1903a coupled to the input node 1905, an inverting input 1903b coupled to a voltage reference, such as ground, and an output 1903c coupled to a third input 1935c of the digital processor 1935. The inverter 1904 has an input coupled to the reference node 1906, and an output coupled to the non-inverting input 1902a of the second comparator 1902. The first to third comparators 1901-1903 generate HIGH, LOW, and ZERO comparator output signals, respectively.

The digital processor 1935 serves to generate a pulse that can be subsequently counted and acted upon when an under-equalized bit is detected. The digital processor 1935 receives the HIGH, ZERO, and/or LOW comparator output signals, and processes them using, for example, current mode logic (CML) logic. Then, the digital processor 1935 outputs a comparison signal comb via its output 1935d to the output node 1907.

In the illustrated embodiment, the window comparator 1920 and the high-speed processor 1930 can be used for the adaptation of the high-pass filter 880 (FIG. 8). In another embodiment, the window comparator 1920 and the high-speed processor 1930 can also be used for the adaptation of the programmable gain amplifier 870 (FIG. 8). In such an embodiment, the third comparator 1903 can be enabled when the window comparator 1920 and the high-speed processor 1930 are used for adapting the high-pass filter 880, and disabled when the window comparator 1920 and the high-speed processor 1930 are used for adapting the programmable gain amplifier 870.

During operation, the first comparator 1901 compares the HPF output voltage $V_{HPF}$ with the positive voltage reference $+V_{REF}$ and generates the HIGH comparator output signal based on the comparison. The second comparator 1902 compares the HPF output voltage $V_{HPF}$ with the negative voltage reference $-V_{REF}$ and generates the LOW comparator output signal based on the comparison. The third comparator 1903 compares the HPF output voltage $V_{HPF}$ with zero differential voltage and generates the ZERO comparator output signal based on the comparison.

FIGS. 20A-20C show three different instances of comparator output signals (HIGH, ZERO, LOW) for three under-equalized sequence types. In the context of this document, symbols HIGHb, ZEROb, and LOWb represent the inverted versions (indicated by "b" or a "bar" above the text) of HIGH, ZERO, and LOW signals, respectively.

A properly equalized . . . 010 . . . transition generates a HIGH pulse that is temporally fully enclosed by a ZERO pulse that in turn is temporally fully enclosed by a LOW pulse. A properly equalized . . . 101 . . . transition generates a LOWb pulse that is temporally fully enclosed by a ZEROb pulse that in turn is temporally fully enclosed by a HIGHb pulse.

An under-equalized type 1 sequence generates two or more HIGH pulses (denoted by reference numeral 2001) that are temporally fully enclosed by a single LOW pulse (rather than two or more LOW pulses, which would otherwise occur when the sequence is properly equalized), as shown in FIG. 20A. Error pulses can be generated for subsequent HIGH pulses after the first HIGH pulse until a LOW pulse is deasserted. The error pulses can be generated using an error pulse generation circuit, which will be described in detail in connection with FIG. 21. Error pulses are generated because after the first HIGH pulse, each negative/positive HIGH transition pair that occurs while LOW is asserted represents under-equalized logic 0 bits.

An under-equalized type 2 sequence generates two or more LOWb pulses (denoted by reference numeral 2002) that are temporally fully enclosed by a single HIGHb pulse (rather than by two or more HIGHb pulses, which would otherwise occur when the sequence is properly equalized), as shown in FIG. 20B. Error pulses should be generated for each subsequent LOWb pulse after the first LOWb pulse until HIGHb is deasserted. Error pulses are generated because after the first LOWb pulse, each negative/positive LOWb transition pair that occurs while HIGHb is asserted represents under-equalized logic 1 bits.

An under-equalized type 3 sequence generates one or more ZERO pulses (denoted by reference numerals 2003a, 2003b) that are temporally fully enclosed by LOW and HIGHb pulses, as shown in FIG. 20C. Error pulses should be generated for each ZERO pulse after the first ZERO pulse until either LOW or HIGHb is deasserted. This is because any negative/positive ZERO transition pair that occurs while LOW and HIGHb are asserted represents under-equalized logic . . . 10 . . . bits.

Figures 21, 22:
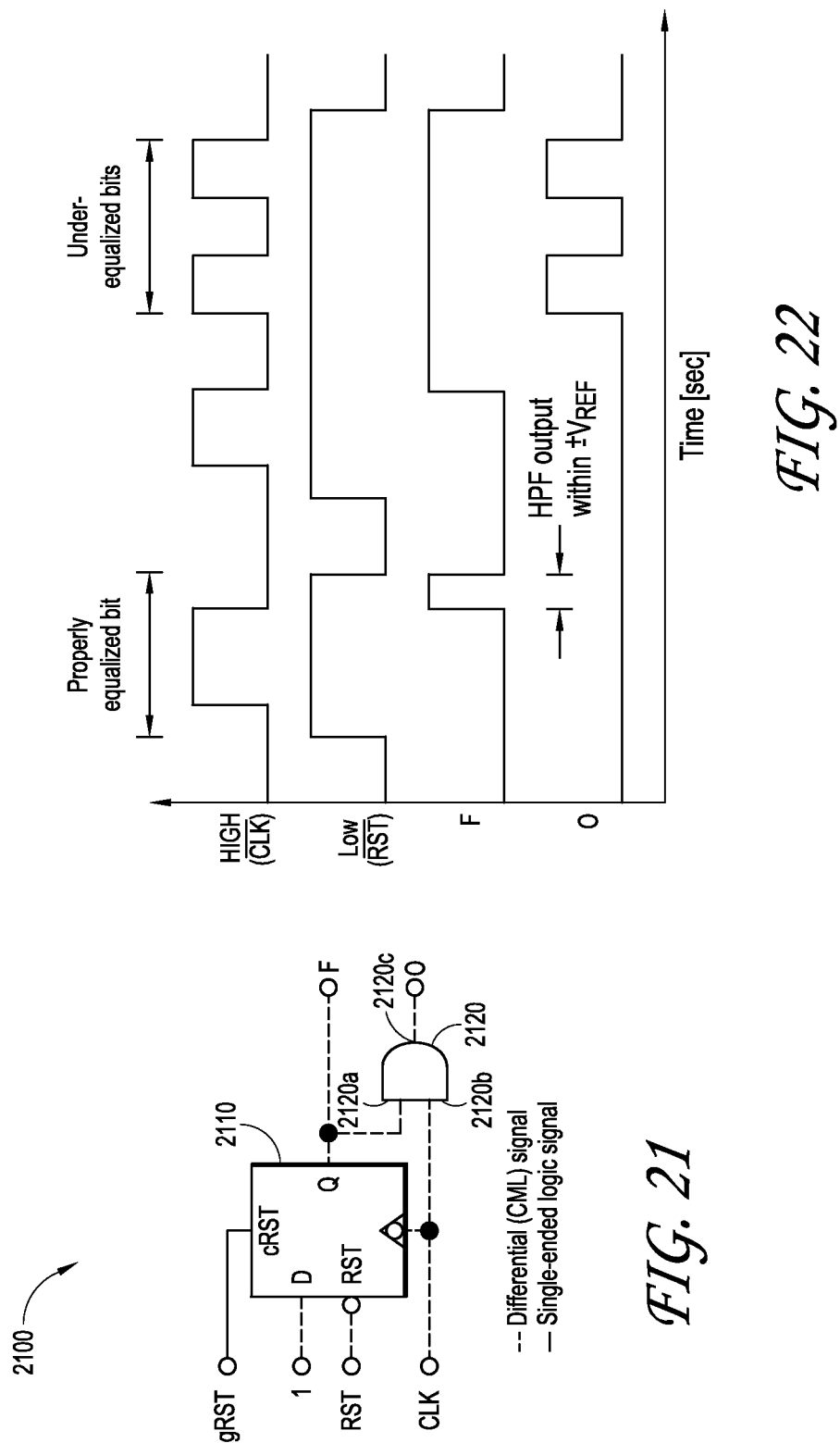
FIG. 21 is a schematic block diagram of an error pulse generator according to one embodiment.
FIG. 22 shows timing diagrams illustrating signals for the error pulse generator of FIG. 21 when configured for a bit stream that can be similar to the first example of the under-equalized serial data stream of FIG. 15B.

Referring to FIG. 21, an error pulse generation circuit according to one embodiment will be described below. The illustrated error pulse generation circuit 2100 includes a D-type flip-flop 2110 and an AND gate 2120. The circuit 2100 illustrated in FIG. 21 can be used to generate error pulses for type 1, 2, or 3 sequences depending on connections and other circuits as will be explained in greater detail later in connection with FIG. 23.

The D-type flip-flop 2110 can include a cRST input to receive an asynchronous single-ended full-swing CMOS reset (gRST) signal, an RST input to receive an asynchronous differential reset (RSTb) signal, a clock input to receive a clock (CLKb) signal, a D input to receive a high (1) signal, and a Q output to provide an output signal F.

The AND gate 2120 can have a first input 2120a to receive the output signal F from the Q output of the D-type flip-flop 2110, a second input 2120b to receive the clock signal, and an output 2120c to provide an AND gate output signal O.

During operation, the gRST is used for initialization during power-on or at the beginning of an under-equalization detection cycle. To configure the circuit 2100 to generate error pulses for type 1 sequences, the HIGH signal from the output 1901c of the comparator 1901 (FIG. 19) is coupled to the CLKb input, and the LOW signal from the output 1902c of the comparator 1902 (FIG. 19) is coupled to the RSTb input. Corresponding waveforms are illustrated in FIG. 22. Assuming that the flip-flop 2110 starts from a reset state, for correctly equalized bits, the output signal F is asserted at the end of the HIGH pulse. A short period of time after this, the output signal F is deasserted at the end of the LOW pulse, as shown in FIG. 22. Throughout this sequence, the output signal O remains deasserted because, for properly equalized pulses, a single HIGH pulse is temporally fully enclosed by a single LOW pulse. However, during an under-equalized type 1 sequence, the output signal F is asserted at the end of the first HIGH pulse and additional HIGH pulses while LOW remains asserted, and the output signal O is asserted at the output 2120c of the AND gate 2120.

In the illustrated embodiment, the output signal F is asserted during the time interval between the HIGH and LOW deassertions, which is the time interval corresponding to when the HPF output is within $\pm V_{REF}$. The high-speed digital processor 1935 (FIG. 19) can use three instances of output signals of the error pulse generation circuit 2100 to detect under-equalization of type 1, 2 and 3 sequences.

Figure 23:
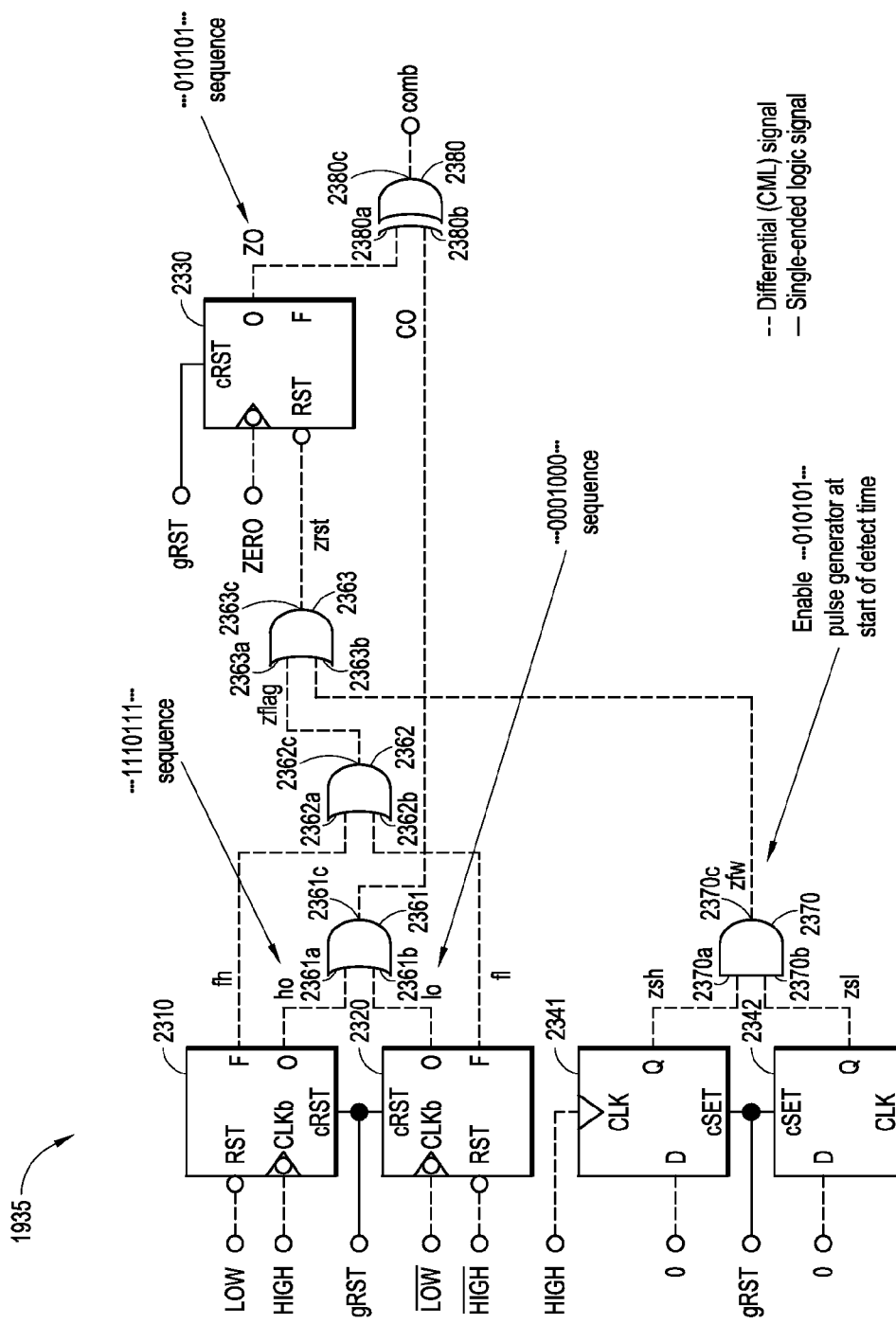
FIG. 23 is a schematic block diagram of a high-speed digital processor for high pass filter adaptation according to one embodiment.

Referring to FIG. 23, a circuit for the high-speed digital processor of FIG. 19 according to one embodiment will be described below. The illustrated digital circuit 1935 includes a first flip-flop circuit 2310, a second flip-flop circuit 2320, a third flip-flop circuit 2330, a first latch 2341, a second latch 2342, first to third OR gates 2361-2363, an AND gate 2370, and an exclusive-OR (XOR) gate 2380.

The first flip-flop circuit 2310 can have an RST input, a cRST input, a CLKb input, an F output, and an O output. The second flip-flop circuit 2320 can have an RST input, a cRST input, a CLKb input, an F output, and an O output. The third flip-flop circuit 2330 can have an RST input, a cRST input, a CLKb input, an F output, and an O output. Details of the flip-flop circuits 2310-2330 can be as described earlier in connection with FIG. 21.

The first latch 2341 can be a D-type latch that has a D input, a CLK input, a cSET input, and a Q output. The second latch 2342 can be a D-type latch that has a D input, a CLK input, a cSET input, and a Q output.

The first OR gate 2361 can have a first input 2361a coupled to the O output of the first flip-flop circuit 2310, a second input 2361b coupled to the O output of the second flip-flop circuit 2320, and an output 2361c. The second OR gate 2362 can have a first input 2362a coupled to the F output of the first flip-flop circuit 2310, a second input 2362b coupled to the F output of the second flip-flop circuit 2320, and an output 2362c. The third OR gate 2363 can have a first input 2363a coupled to the output 2362c of the second OR gate 2362, a second input 2363b, and an output 2363c.

The AND gate 2370 can have a first input 2370a coupled to the Q output of the first latch 2341, a second input 2370b coupled to the Q output of the second latch 2342, and an output 2370c coupled to the second input 2363b of the third OR gate 2363. The XOR gate 2380 can have a first input 2380a coupled to the O output of the third flip-flop circuit 2330, a second input 2380b coupled to the output 2361c of the first OR gate 2361, and an output 2380c to provide a comb signal S3 (see FIG. 8).

During operation, all of the flip-flop circuits 2310-2330 and the latches 2341, 2342 should be initialized (either set or reset) at power-up or at the start of an under-equalization detection cycle. A ho signal from the O output of the first flip-flop circuit 2310 carries the type 1 sequence error pulses. A lo signal from the O output of the second flip-flop circuit 2320 carries the type 2 sequence error pulses. A co signal from the output 2361c of the first OR gate 2361 is a combination of both of these error pulses since these pulses do not overlap temporally.

In the event that the amplitude of the HPF output signal $|V_{HPF}|$ is less than or equal to the window voltage reference $V_{REF}$, that is ($|V_{HPF}| \leq V_{REF}$), at the beginning of an under-equalization detection cycle, additional circuitry is used to control the reset of the error pulse generator for the type 3 sequences that generate a zo signal from the O output of the third flip-flop circuit 2330, because the detector should be enabled (not reset). In this case, it is conceivable that some under-equalized type 3 sequences can appear in the bit stream before the HPF output voltage $V_{HPF}$ goes above or below the reference voltage $V_{REF}$, and no error pulses would be generated if the detector remains reset.

To address this potential start-up problem, the first and second D-type latches 2341, 2342 with asynchronous set can ensure that the error pulse generator starts off enabled (zrst at the output 2363c of the third OR gate 2363 asserted) if the HPF output is between $+V_{REF}$ and $-V_{REF}$ (HIGH is deasserted and LOW is asserted), and it remains in that state until the first positive transition of HIGH (signaled by zsh from the Q output of the first latch 2341) or the first negative transition of LOWb (signaled by zsl from the Q output of the second latch 2342) occur.

Upon the first occurrence of either of these events, the pulse generator is reset since the HPF output is then either above or below the reference voltage and a type 3 sequence should not exist until the HPF output is again within $\pm V_{REF}$. After this first reset, the type 3 sequence error pulse generator remains reset when HIGH is asserted or LOW is deasserted using the F output of the type 1 and type 2 sequence error pulse generators (events indicated by deassertion of the zflag signal from the output 2362c of the second OR gate 2362). These F outputs start the detection cycle deasserted through the global reset signal gRST (provided to the cRST input of the third flip-flop circuit 2330), hence the use of the extra D-type latches 2341, 2342.

The type 1 and type 2 error pulses (co) are combined with the type 3 error pulses (zo) via the exclusive-OR (XOR) gate 2380 to generate the final processor output, labeled as the comb signal. This type of logic gate is preferable because an OR gate would not show zo error pulses when there are also co pulses. This situation can occur when the HPF output goes above $-V_{REF}$ (or below $+V_{REF}$) and stays there for several bits that include type 1 (or type 2) and type 3 sequences.

Method of Adapting High-Pass Filter

Figure 24:
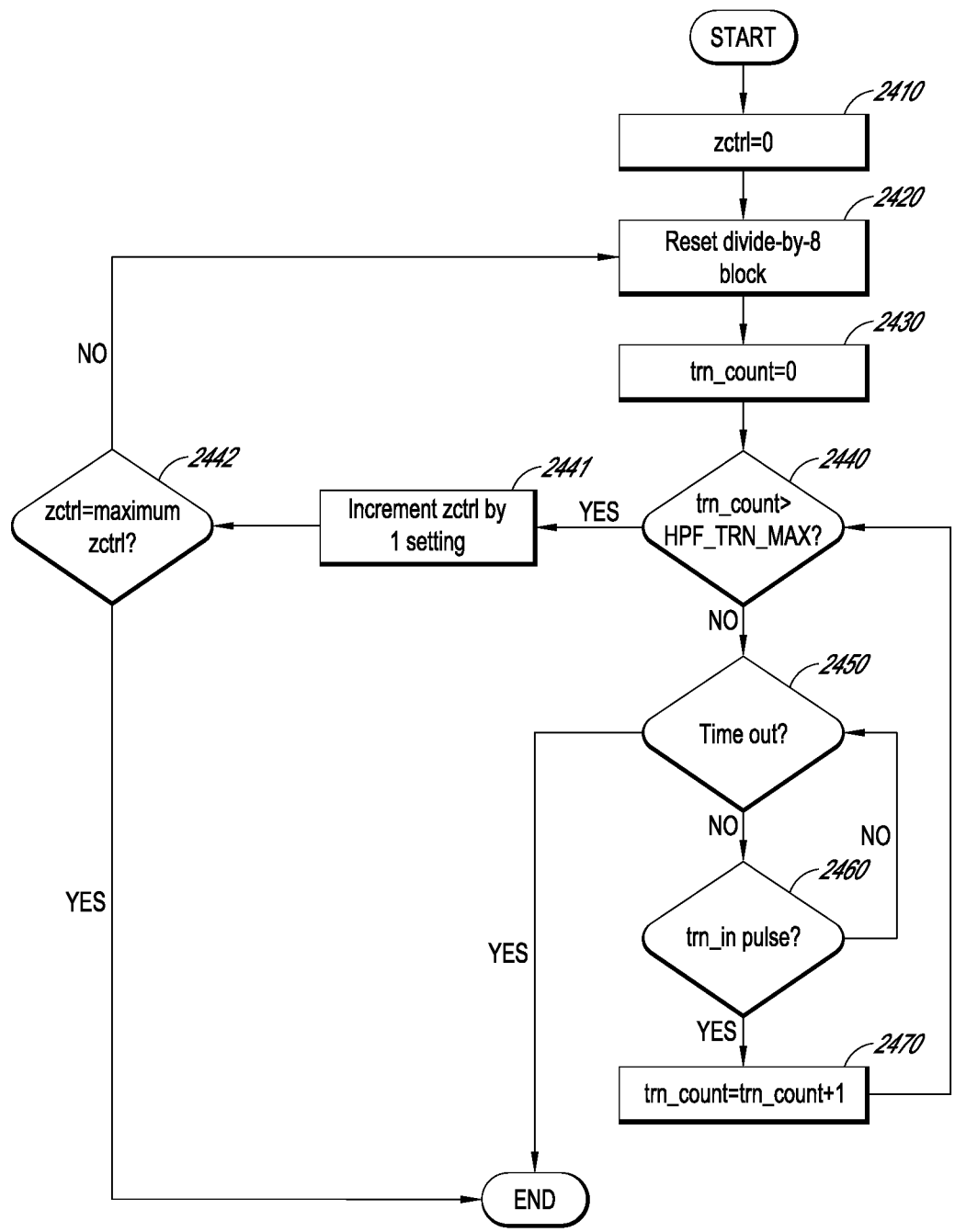
FIG. 24 is a flowchart illustrating a method of adapting a digitally-controlled equalizer according to one embodiment.

Referring to FIG. 24, a method of adapting a high-pass filter (HPF) according to one embodiment will be described below. The method of adapting a HPF is similar to that of adapting a PGA in that a finite number of settings are systematically swept from lowest high-frequency boost to highest high-frequency boost. In adapting a HPF, a set G can contain available settings, which can be carried by the digital bus zctrl.

As described in connection with FIGS. 15A-23, in the equalizer 800 of FIG. 8, if an HPF output signal is under-equalized (for example, the HPF output signal is one of the type 1 to 3 sequences shown in FIGS. 15A-17B), one or more error pulses (for example, the trn_in signal of FIG. 8) are generated for under-equalized transitions from the high-speed digital processor 830.

In adapting the HPF, the digital controller 860 (FIG. 8) can determine a proper level of high-frequency boost, by detecting the number of such error pulses. In one embodiment, the boost setting of the HPF is initially set at its lowest. A counter is used to count the number of error pulses from the digital processor 830 for a selected period of time, which is typically predetermined in implementation. If the number of error pulses detected during the selected period is greater than a particular number (which can indicate that the HPF output signal is under-equalized), the boost setting of the PGA is considered to be lower than needed. An example of the selected period is between about 8 milliseconds and about 15 milliseconds. An example of the particular number is between about 1 and about 4. Other periods and numbers will be readily determined by one of ordinary skill in the art. The next highest boost setting is selected, and these steps are repeated until the HPF output signal is equalized.

FIG. 24 is a flowchart illustrating a more detailed method of adapting a HPF according to one embodiment. At block 2410, a high-pass filter (HPF) boost (zctrl) is initially set at its lowest (zctrl=0) (unity gain or no high-frequency boost). At block 2420, the frequency divider (for example, divide-by-8 frequency divider 840 of FIG. 8) is reset. At block 2430, an error pulse count (trn_count) from the signal 55 of FIG. 8 is set to 0.

A counter counts error pulses trn_in received during a fixed wait period, and generates an error pulse count (trn_count). At block 2440, if the number of trn_in error pulses received during the wait period exceeds a constant HPF_TRN_MAX (which is user-programmable), the zctrl high-frequency boost in use is considered too low (YES at the block 2440). An example of the constant HPF_TRN_MAX is between about 1 and about 4. Other values will be readily determined by one of ordinary skill in the art. Then, the next highest zctrl setting is selected by incrementing zctrl by 1 setting at block 2441. If zcrtl reaches the maximum zcrtl at block 2442, the process is terminated. If not, the process returns to the block 2420.

At block 2440, if the answer is NO, it is determined whether the fixed wait period has elapsed at block 2450. An example of the fixed wait period is between about 8 milliseconds and about 15 milliseconds. If YES, the process is terminated. If not, it is determined if there is an additional trn_in pulse at block 2460. If NO, the process returns to the block 2450. If YES, the trn_count is increased by 1 at block 2470, and the process returns to the block 2440.

The adaptation process can end when the number of trn_in error pulses received during the wait period does not exceed HPF_TRN_MAX. In this case, the zctrl setting in use provides the smallest high-frequency boost for which the HPF output transitions are at least $2 \cdot V_{REF}$. The adaptation cycle can also end when zctrl equals its maximum setting (for example, 63 in the embodiment of FIG. 24), since this setting corresponds to the largest available HPF high frequency boost.

Method of Selecting High-Pass Filter Setting

Figure 25:
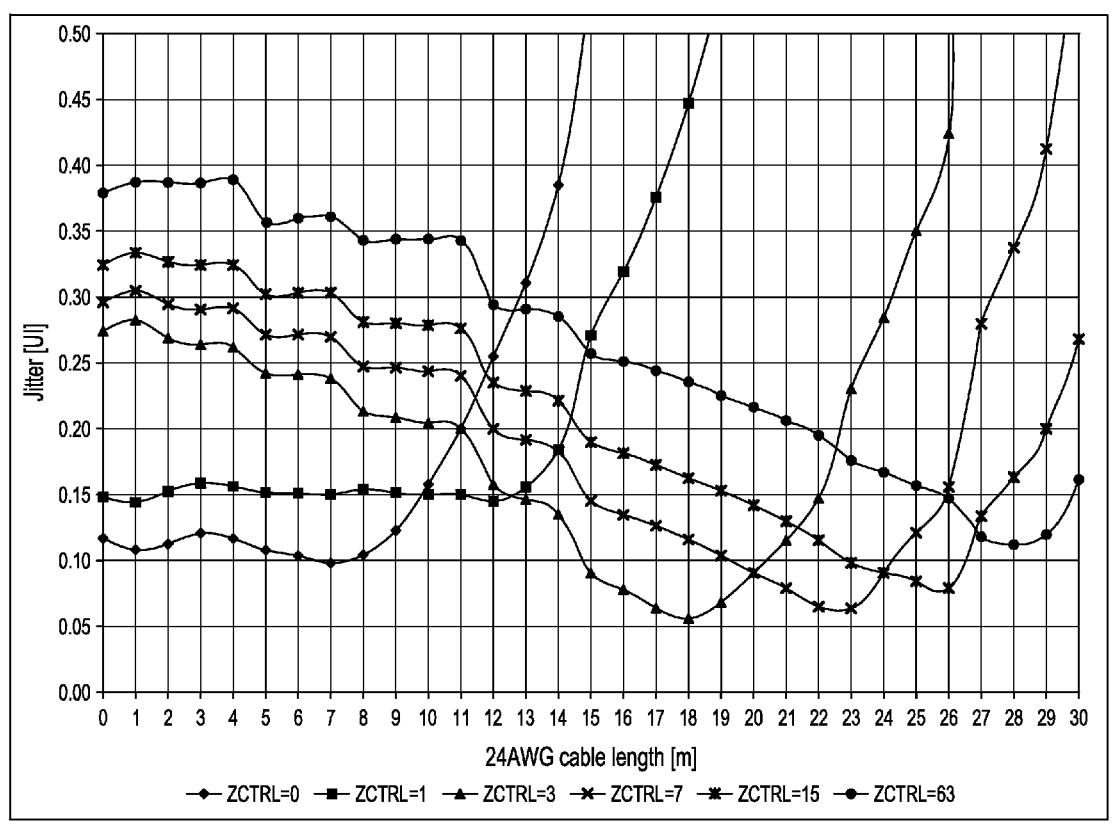
FIG. 25 is a graph illustrating relationship between jitter and channel length in a serial receiver according to one embodiment, in which the digitally-controlled equalizer is adapted.

Referring to FIG. 25, a method of selecting a high-pass filter setting according to one embodiment will be described below. The method can be implemented by the digital controller 860 (FIG. 8). FIG. 25 shows an example of the ISI jitter performance of a digitally-controlled high-pass filter versus channel length of HDMI cable in this example. In FIG. 25, "UI" represents a unit interval for a bit.

For desired jitter performance, there should be a mechanism implemented to select a relatively good jitter curve for a supported cable length, more preferably, the lowest jitter curve for any attenuation level. A given attenuation level maps to a particular cable length of a particular wire gauge. For example, for a bit stream data rate DR=2.97 Gbs, −30 dB of loss at 0.75·DR maps to ~20 m of 24AWG cable or ~13 m of 28AWG cable. 0.75·DR is the upper limit of the frequency range in which 94% of the signal power of a random non-return to zero sequence resides.

In one embodiment, in selecting a high-pass filter setting, the following example inquiries are made: (1) the number of stages used, (2) the singularities of the unique unit stages, and (3) the order of turning on the stages. In addition, it is desirable to minimize the number of stages to reduce circuit area and power consumption.

The HPF adaptation method described in connection with FIG. 24 relies on error pulses to select the appropriate setting, and these error pulses in turn are a function of the window comparator reference voltage, $V_{REF}$. For example, unless the data eye of a bit stream is completely closed, $V_{REF}$=0V would not generate any error pulses and the first setting would always be selected. On the other extreme, if $V_{REF}$>max ($V_{HPF}$), any HPF setting would generate error pulses and the maximum setting would always be selected.

One mechanism to select a relatively good jitter setting is to change the reference voltage $V_{REF}$ as a function of the selected setting, that is, make sctrl (see FIG. 8) dependent on zctrl. The parameter sctrl corresponds to the fourth control signal C4, which is generated as an output of the digital controller. The control signal C4 or sctrl can be provided as an input to a digital-to-analog converter to generate the window reference voltage $V_{REF}$ of the window comparator 820. The disclosed method can be implemented in the digital controller 860. Given the adaptation method of the above described embodiment, the appropriate sctrl setting of a given zctrl setting can be the lowest sctrl setting that produces at least the HPF_TRN_MAX number of error pulses in a given wait time for the first channel length for which the given zctrl setting is not optimal. For example, in FIG. 25, for zctrl=1, the appropriate sctrl setting would produce at least the HPF_TRN_MAX number of error pulses during a given wait time only for channel lengths of 13 meters (m) and longer. As it can be seen, the zctrl=1 jitter curve produces lower jitter than the next available curve, zctrl=3, for channel lengths less than 12 meters. For channel lengths greater than 12 meters, zctrl=3 offers better (lower) jitter.

Referring to FIGS. 26A-26F, a method of controlling segments of a high-pass filter according to some embodiments will be described below. Each of FIGS. 26A-26F shows a matrix having 6 rows and 6 columns. Each of the rows represents a setting that can be selected, depending on the requirements of a system or data transmission. Each of the columns 0-5 represents a unique unit stage, such as those described in connection with FIGS. 13A-13C. The unique unit stages preferably have the same configuration and transfer function as one another. In other embodiments, at least two of the unit stages can have different configurations and transfer functions from one another. In the illustrated embodiment, a unique unit stage in column n, if selected, can provide zctrl=$2^n$, where n is 0 to 5, thus discretely contributing to a transfer function or filter characteristics of the high-pass filter.

Figure 26A:
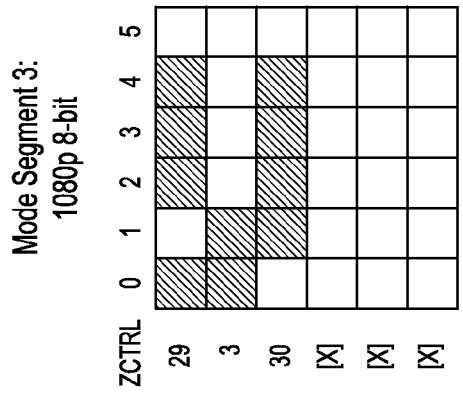
FIGS. 26A-26F are schematic block diagrams illustrating a method of adapting a digitally-controlled equalizer according to some embodiments.

FIG. 26A shows an example setting for Mode Segment 1 for 480p/VGA video transmission. In this example, only the first row is enabled with all the unit stages on. That is, this setting provides a default setting with zctrl=63 with the columns 0-5 on.

Figure 26B:
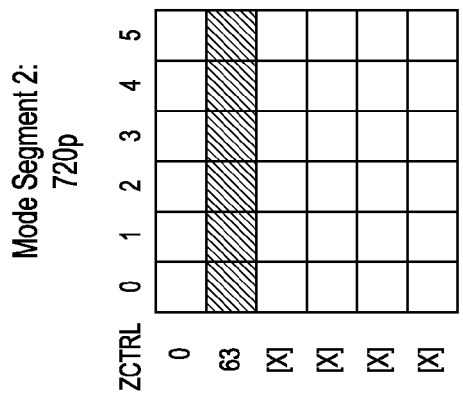

FIG. 26B shows an example setting for Mode Segment 2 for 720p video transmission. In this example, the first and second rows are enabled. The first row, if selected, provides zctrl=0. The second row, if selected, provides zctrl=63.

Figure 26C:
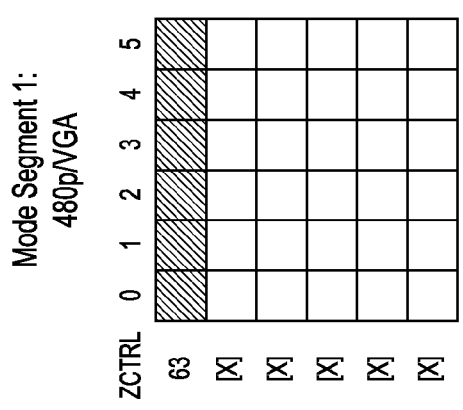

FIG. 26C shows an example setting for Mode Segment 3 for 1080p 8-bit video transmission. In this example, the first to third rows are enabled. The first row, if selected, provides zctrl=29 with the columns 0, 2, 3, and 4 on. The second row, if selected, provides zctrl=3 with the columns 0 and 1 on. The third row, if selected, provides zctrl=30 with the columns 1-4 on.

Figure 26D:
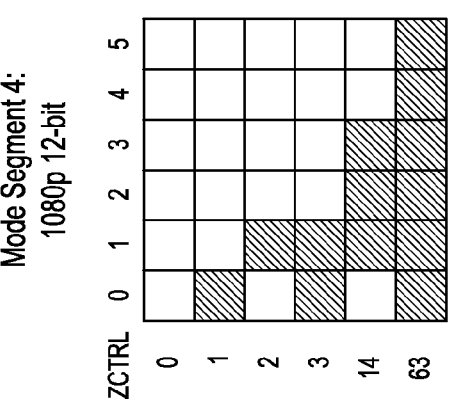

FIG. 26D shows an example setting for Mode Segment 4 for 1080p 12-bit video transmission. In this example, the first to sixth rows are enabled. The first row, if selected, provides zctrl=0 with no columns on. The second row, if selected, provides zctrl=1 with the column 0 on. The third row, if selected, provides zctrl=2 with the column 1 on. The fourth row, if selected, provides zctrl=3 with the columns 0 and 1 on.

The fifth row, if selected, provides zctrl=14 with the columns 1-3 on. The sixth row, if selected, provides zctrl=63 with the columns 0-5 on.

Figure 26E:
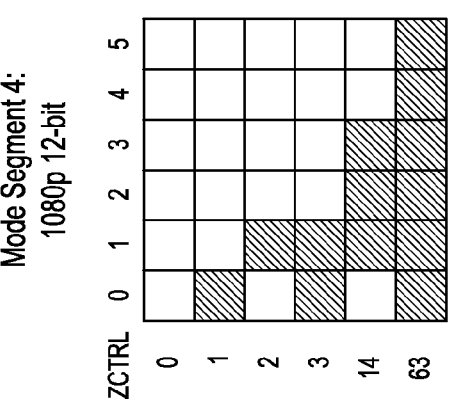

FIG. 26E shows an example setting for Mode Segment 5 for 1080p 16-bit video transmission. In this example, the first to sixth rows are enabled. The first row, if selected, provides zctrl=0 with no columns on. The second row, if selected, provides zctrl=1 with the column 0 on. The third row, if selected, provides zctrl=3 with the columns 0 and 1 on. The fourth row, if selected, provides zctrl=7 with the columns 0-2 on. The fifth row, if selected, provides zctrl=15 with the columns 0-3 on. The sixth row, if selected, provides zctrl=63 with the columns 0-5 on.

Figure 26F:
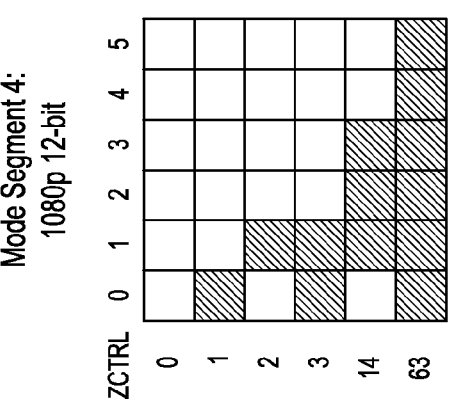

FIG. 26F shows an example setting for Mode Segment 6 for HDMI 1.4 transmission. In this example, the first to sixth rows are enabled. The first row, if selected, provides zctrl=0 with no columns on. The second row, if selected, provides zctrl=1 with the column 0 on. The third row, if selected, provides zctrl=7 with the columns 0-2 on. The fourth row, if selected, provides zctrl=15 with the columns 0-3 on. The fifth row, if selected, provides zctrl=31 with the columns 0-4 on. The sixth row, if selected, provides zctrl=63 with the columns 0-5 on. FIGS. 26A-26F are only for illustrative purposes, and a skilled artisan will appreciate that various other settings can be used, depending on the requirements of a specific data transmission.

Applications

In the embodiments described above, data transmission systems employing the above described configurations can be implemented into various electronic devices or integrated circuits. Examples of the electronic devices can include, but are not limited to, consumer electronic products, parts of the consumer electronic products, electronic test equipments, etc. Examples of the electronic devices can also include memory chips, memory modules, circuits of optical networks or other communication networks, and disk driver circuits. The consumer electronic products can include, but are not limited to, a mobile phone, a smart phone, cellular base stations, a telephone, a television, a computer monitor, a computer, a hand-held computer, a tablet computer, a personal digital assistant (PDA), a stereo system, a cassette recorder or player, a set-top box, a satellite television receiver, a cable television receiver, an Internet video streaming receiver box, a portable media player, a video game console, a DVD player, a CD player, a VCR, an MP3 player, a radio, a camcorder, a camera, a digital video recorder, a digital camera, a portable memory chip, a copier, a facsimile machine, a scanner, a multi functional peripheral device, a wrist watch, a clock, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
an equalizer configured to process an input signal transmitted over a channel, the equalizer comprising:
a first node configured to receive the input signal;
a second node;
a programmable gain amplifier (PGA) having an adjustable gain, the PGA having an input electrically coupled to the first node, and an output electrically coupled to a third node;
a high pass filter (HPF) having an input electrically coupled to the third node, and an output electrically coupled to the second node; and
a control block configured to adjust one or more of the PGA or the HPF at least partly in response to a PGA output signal from the PGA or an HPF output signal from the HPF,
wherein the HPF comprises one or more unit stages, wherein each of the unit stages has a frequency response for a signal to be boosted by the unit stage,
wherein at least one of the unit stages has a first mode of operation in which the unit stage has unity gain, and a second mode of operation in which the unit stage provides a high-frequency boost.

2. The apparatus of claim 1, wherein the control block is configured to adjust the gain of the PGA at least partly in response to the PGA output signal such that the PGA output signal has a substantially constant amplitude envelope.

3. The apparatus of claim 2, wherein the PGA comprises two or more transconductance units, each of the transconductance units being electrically coupled in parallel between two nodes of the PGA, wherein the PGA is configured to select at least one of the transconductance units to provide at least part of the gain of the PGA, at least partly in response to a control signal from the control block.

4. The apparatus of claim 3, wherein the PGA comprises a coarse gain adjustment stage and a fine gain adjustment stage coupled in series between the first node and the third node, wherein the coarse gain adjustment stage is configured to adjust the gain of the PGA more coarsely than the fine gain adjustment stage.

5. The apparatus of claim 1, wherein the HPF comprises two or more unit stages coupled in series between the third node and the second node.

6. The apparatus of claim 5, wherein one of the unit stages has a first frequency range having a first lower limit and a first higher limit, wherein another of the unit stages has a second frequency range having a second lower limit and a second higher limit, wherein the first higher limit is substantially the same in frequency as the second higher limit, wherein the first lower limit is lower in frequency than the second lower limit such that the unit stages have different frequency responses.

7. The apparatus of claim 5, wherein the HPF comprises a first unique stage group including two or more first unit stages having substantially the same transfer function as one another; and a second unique stage group including two or more second unit stages having substantially the same transfer function as one another, wherein the transfer function of one of the first unit stages is different from the transfer function of one of the second unit stages.

8. The apparatus of claim 1, wherein the control block comprises a digital controller configured to generate control signals to one or more of the PGA or the HPF to adjust the gain of the PGA or to adjust a transfer function of the HPF.

9. An apparatus comprising:
an equalizer configured to process an input signal transmitted over a channel, the equalizer comprising:
a first node configured to receive the input signal;
a second node;
a programmable gain amplifier (PGA) having an adjustable gain, the PGA having an input electrically coupled to the first node, and an output electrically coupled to a third node;

a high pass filter (HPF) having an input electrically coupled to the third node, and an output electrically coupled to the second node; and a control block configured to adjust one or more of the PGA or the HPF at least partly in response to a PGA output signal from the PGA or an HPF output signal from the HPF, wherein the control block comprises a digital controller configured to generate control signals to one or more of the PGA or the HPF to adjust the gain of the PGA or to adjust a transfer function of the HPF, wherein the control block comprises a window comparator configured to generate an output signal based on a comparison of an input signal with two or more reference voltages, and wherein the digital controller is configured to generate the control signals based at least partly on the output signal of the window comparator.

10. The apparatus of claim 9, wherein the digital controller is further configured to generate another control signal to be provided to the window comparator to generate a first reference voltage of the two or more reference voltages of the window comparator.

11. An apparatus comprising:
an equalizer configured to process an input signal transmitted over a channel, the equalizer comprising:
a first node configured to receive the input signal;
a second node;
a programmable gain amplifier (PGA) having an adjustable gain, the PGA having an input electrically coupled to the first node, and an output electrically coupled to a third node;
a high pass filter (HPF) having an input electrically coupled to the third node, and an output electrically coupled to the second node; and
a control block configured to adjust one or more of the PGA or the HPF at least partly in response to a PGA output signal from the PGA or an HPF output signal from the HPF,
wherein the control block comprises a window comparator having an input configured to receive the PGA output signal or the HPF output signal, wherein the window comparator is configured to compare the PGA output signal or the HPF output signal with two or more reference voltages to generate information on an amplitude envelope of the PGA output signal or information on equalization of the HPF output signal.

12. The apparatus of claim 11, wherein the control block further comprises a multiplexer having a first input electrically coupled to the third node, and a second input electrically coupled to the second node, and an output electrically coupled to the input of the window comparator, wherein the multiplexer is configured to selectively provide either the PGA output signal or the HPF output signal to the input of the window comparator.

13. The apparatus of claim 12, wherein the control block further comprises:
a frequency divider;
a current mode logic (CML) digital processor located downstream of the window comparator;
a logic representation converter located downstream of the frequency divider; and
a digital controller located downstream of the logic representation converter, the digital controller being configured to provide control signals to one or more of the PGA or the HPF,
wherein the frequency divider is located between the CML digital processor and the logic representation converter.

14. The apparatus of claim 11, wherein the two or more reference voltages comprise a positive reference voltage and a negative reference voltage, wherein the positive reference voltage has a positive voltage polarity and a magnitude about equal to a threshold voltage, wherein the negative reference voltage has a negative voltage polarity and a magnitude about equal to the threshold voltage, wherein the window comparator is configured to provide a window comparator output signal that is asserted when an absolute value of an amplitude envelope of the PGA output signal is greater than the threshold voltage, and deasserted when the amplitude envelope of the PGA output signal is smaller than the threshold voltage.

15. The apparatus of claim 14, wherein the window comparator comprises:
a first comparator having a non-inverting input electrically coupled to the input of the window comparator, an inverting input electrically coupled to the positive voltage reference, and an output;
an inverter having an input electrically coupled to the positive voltage reference, and an output configured to generate the negative voltage reference; and
a second comparator having a non-inverting input electrically coupled to the output of the inverter, an inverting input electrically coupled to the input of the window comparator, and an output.

16. The apparatus of claim 15, wherein the control block further comprises an OR gate having a first input electrically coupled to the output of the first comparator, and a second input electrically coupled to the output of the second comparator.

17. The apparatus of claim 15, wherein the two or more voltage references further comprises a zero voltage reference, wherein the window comparator further comprises a third comparator having a non-inverting input electrically coupled to the input of the window comparator, an inverting input electrically coupled to the zero voltage reference, and an output.

18. The apparatus of claim 17, wherein the control block further comprises a current mode logic (CML) digital processor having a first input electrically coupled to the output of the first comparator, a second input electrically coupled to the output of the second comparator, and a third input electrically coupled to the output of the third comparator.

19. The apparatus of claim 17, wherein the first, second, and third comparators generate first, second, and third output signals, respectively, at the outputs thereof, and wherein different combinations of logic levels of the first to third output signals represent different under-equalized states of the input signal.

20. An apparatus comprising:
a high pass filter (HPF) having an input to receive an input signal and an output to provide an HPF output signal, the HPF being configured to boost the input signal within a selected frequency range,
wherein the HPF comprises one or more unit stages coupled in series between the input and the output of the HPF,
wherein each of the unit stages has a boost frequency response within which a signal is boosted by the unit stage, and
wherein at least one of the unit stages has a first mode of operation in which the unit stage has unity gain, and a second mode of operation in which the unit stage provides a frequency boost for the boost frequency response of the unit stage.

21. The apparatus of claim 20, wherein the HPF comprises two or more unit stages coupled in series between the input and the output of the HPF.

22. The apparatus of claim 21, wherein one of the unit stages has a first boost frequency range having a first lower limit and a first higher limit, wherein another of the unit stages has a second boost frequency range having a second lower limit and a second higher limit, wherein the first higher limit is substantially the same in frequency as the second higher limit, wherein the first lower limit is lower in frequency than the second lower limit such that the unit stages have different frequency responses.

23. The apparatus of claim 21, wherein the HPF comprises a first unique stage group including two or more first unit stages having substantially the same transfer function as one another; and a second unique stage group including two or more second unit stages having substantially the same transfer function as one another, wherein the transfer function of one of the first unit stages is different from the transfer function of one of the second unit stages.

24. The apparatus of claim 21, wherein two or more of the unit stages have different boost amounts from one another.

25. A method for adapting a gain of a programmable gain amplifier in a receiver, the method comprising:
- receiving an input signal at an input of the receiver over a channel;
- amplifying the input signal with the programmable gain amplifier (PGA) with an adjustable gain to generate a PGA output signal having an amplitude envelope;
- monitoring the amplitude envelope of the PGA output signal; and
- adjusting the gain of the PGA, based at least partly on the monitored amplitude envelop;
- wherein monitoring the amplitude envelope comprises:
- generating one or more pulses when the amplitude envelope has an absolute value above a reference voltage;
- counting the number of pulses over a defined time period; and
- adjusting the gain of the PGA if the number of pulses is less than a selected number.

26. A method for adapting a frequency boost setting of a high-pass filter in a receiver, the method comprising:
- receiving an input signal at an input of the receiver over a channel;
- boosting a frequency range of the input signal with the high-pass filter (HPF) with an adjustable frequency boost setting to generate an HPF output signal;
- monitoring a plurality of transitions of the HPF output signal with reference to two or more reference voltages to determine whether the HPF output signal is under-equalized; and
- adjusting the boost setting of the HPF, based at least partly on the monitored transitions.

27. The method of claim 26, wherein monitoring the plurality of transitions of the HPF output signal comprises:
- generating one or more error pulses when the plurality of transitions with reference to the two or more reference voltages indicate that the HPF output signal is under-equalized;
- counting the number of the error pulses; and
- adjusting the boost setting of the HPF if the number of error pulses is greater than a selected number.

28. The method of claim 26, wherein the HPF comprises one or more unit stages, wherein each of the unit stages has a boost frequency response for a signal to be boosted by the unit stage, wherein adjusting the boost setting comprises enabling at least one of the one or more unit stages.

29. The method of claim 28, further comprising selecting one of a plurality of mode segments associated with types of data transmission, each of the mode segments having one or more boost settings, each of which provides a different frequency boost by one or more of the unit stages,
- wherein adjusting the boost setting comprises changing a boost setting of the selected mode segment to another boost setting of the selected mode segment.

* * * * *